(12) United States Patent
He et al.

(10) Patent No.: US 11,170,470 B1
(45) Date of Patent: Nov. 9, 2021

(54) CONTENT-ADAPTIVE NON-UNIFORM IMAGE DOWNSAMPLING USING PREDICTIVE AUXILIARY CONVOLUTIONAL NEURAL NETWORK

(71) Applicant: Facebook, Inc., Menlo Park, CA (US)

(72) Inventors: Zijian He, Menlo Park, CA (US); Peter Vajda, Palo Alto, CA (US); Priyam Chatterjee, Los Gatos, CA (US); Shanghsuan Tsai, Sunnyvale, CA (US); Dmitrii Marin, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 32 days.

(21) Appl. No.: 16/705,829

(22) Filed: Dec. 6, 2019

Related U.S. Application Data

(60) Provisional application No. 62/776,314, filed on Dec. 6, 2018.

(51) Int. Cl.
  *G06K 9/00* (2006.01)
  *G06T 3/40* (2006.01)
  (Continued)

(52) U.S. Cl.
  CPC ............ *G06T 3/4007* (2013.01); *G06K 9/624* (2013.01); *G06K 9/628* (2013.01); *G06T 7/11* (2017.01);
  (Continued)

(58) Field of Classification Search
  CPC ............... G06T 3/4007; G06T 7/11; G06T 2207/20081; G06T 2207/20084; G06K 9/624; G06K 9/628
  See application file for complete search history.

(56) References Cited

U.S. PATENT DOCUMENTS

| | | | |
|---|---|---|---|
| 2011/0257505 A1* | 10/2011 | Suri | A61B 6/5217 600/408 |
| 2015/0269439 A1* | 9/2015 | Versace | G06T 7/194 382/103 |

(Continued)

OTHER PUBLICATIONS

Dmitry ("Blended barycentric coordinates", Feb. 22, 2017, Computer Aided Geometric Design, 0167-8396/© 2017 Elsevier B.V) (Year: 2017).*

(Continued)

*Primary Examiner* — Ping Y Hsieh
(74) *Attorney, Agent, or Firm* — Shumaker & Sieffert, P.A.

(57) ABSTRACT

Techniques are described for content-adaptive downsampling of digital images and videos for computer vision operations, such as semantic segmentation. A computer vision system comprises a memory, one or more processors operably coupled to the memory and a downsampling module configured for execution by the one or more processors to perform, based on a non-uniform sampling model trained to predict content-aware sampling parameters, downsampling input image data to generate downsampled image data. A segmentation module is configured for execution by the one or more processors to perform segmentation on the downsampled image to produce a segmentation result, such as a feature map that assigns pixels of the downsampled image data to object classes. An upsampling module is configured for execution by the one or more processors to perform upsampling according to the segmentation result to produce upsampled image data.

14 Claims, 16 Drawing Sheets

(51) Int. Cl.
 *G06T 7/11* (2017.01)
 *G06K 9/62* (2006.01)
(52) U.S. Cl.
 CPC ............... *G06T 2207/20081* (2013.01); *G06T 2207/20084* (2013.01)

(56) References Cited

U.S. PATENT DOCUMENTS

| | | | |
|---|---|---|---|
| 2018/0260956 A1* | 9/2018 | Huang | G06K 9/6271 |
| 2019/0050667 A1* | 2/2019 | Wang | G06K 9/4604 |
| 2019/0180502 A1* | 6/2019 | England | G06T 15/08 |

OTHER PUBLICATIONS

Alom ("Recurrent Residual Convolutional Neural Network based on U-Net (R2U-Net) for Medical Image Segmentation", May 29, 2018, Computer Vision and Pattern Recognition, arXiv: 1802.06955) (Year: 2018).*
Agarwal et al., "Learning to detect objects in images via a sparse, part-based representation," IEEE Transactions on Pattern Analysis and Machine Intelligence, vol. 26, No. 11, Nov. 2004, 16 pp.
Badrinarayanan et al., "SegNet: A Deep Convolutional Encoder-Decoder Architecture for Image Segmentation," Computer Vision and Pattern Recognition, Nov. 2015, 14 pp.
Chen et al., DeepLab: Semantic Image Segmentation with Deep Convolutional Nets, Atrous Convolution, and Fully Connected CRFs., IEEE Transactions on Pattern Analysis and Machine Intelligence, vol. 40, No. 4, Apr. 2018, published Apr. 2017, 14 pp.
Chen et al., "Encoder-Decoder with Atrous Separable Convolution for Semantic Image Segmentation," ArXiv, No. 1802.02611, Aug. 2018, 18 pp.
Chen et al., "Rethinking Atrous Convolution for Semantic Image Segmentation," ArXiv, No. 1706.05587, Dec. 2017, 14 pp.
Chollet, F., "Xception: Deep Learning with Depthwise Separable Convolutions," 2017 IEEE Conference on Computer Vision and Pattern Recognition (CVPR), Jul. 2017, 8 pp.
Cordts et al., "The Cityscapes Dataset for Semantic Urban Scene Understanding," IEEE Conference on Computer Vision and Pattern Recognition (CVPR), Apr. 2016, 11 pp.
Dai et al., "Deformable Convolutional Networks," Proceedings of the IEEE International Conference on Computer Vision, Oct. 2017, 10 pp.
Delaunay et al., "Sur la sphere vide. [On the empty sphere]" Izvestia Akademii Nauk SSSR. Otdelenie Matematicheskikh I Estestvennykh Nauk, No. 7, 1934, 8 pp. (No English translation) (Applicant points out, in accordance with MPEP 609.04(a) that the year of publication, 1934, is sufficiently earlier than the effective filing U.S. filing date, so that the particular month of publication is not in issue.).
Everingham et al., "The 2005 PASCAL Visual Object Classes Challenge," In Quinonero-Candela J., Dagan I., Magnini B., d'Alche-Buc F. (Eds) Machine Learning Challenges. Evaluating Predictive Uncertainty, Visual Object Classification, and Recognising Tectual Entailment. MLCW 2005. Lecture Notes in Computer Science, vol. 3944, 2006, 65 pp. (Applicant points out, in accordance with MPEP 609.04(a) that the year of publication, 2006, is sufficiently earlier than the effective U.S. filing date, so that the particular month of publication is not in issue.).
Everingham et al., "The PASCAL Visual Object Classes Challenge 2012 (VOC2012) Development Kit," May 2012, 32 pp.
Fei-Fei et al., "Learning Generative Visual Models for Few Training Examples: An Incremental Bayesian Approach Tested on 101 Object Categories," Computer Vision and Image Understanding, vol. 106, No. 1, Mar. 2007, 12 pp.
Figurnov et al., "PerforatedCNNs" Acceleration through Elimination of Redundant Convolutions, Advances in Neural Information Processing Systems, Oct. 2016, 9 pp.
Figurnov et al., "Spatially Adaptive Computation Time for Residual Networks," Proceedings of the of the IEEE Conference on Computer Vision and Pattern Recognition (CVPR), Jul. 2017, 10 pp.
Girshick et al., "Rich Feature Hierarchies for Accurate Object Detection and Semantic Segmentation," IEEE Conference on Computer Vision and Pattern Recognition (CVPR), Jun. 2014, 8 pp.
Girshick, R., "Fast R-CNN," IEEE International Conference on Computer Vision (ICCV) Dec. 2015, 9 pp.
Hariharan et al., "Semantic contours from Inverse detectors," 2011 International Conference on Computer Vision, Nov. 2011, 8 pp.
He et al., "Deep Residual Learning for Image Recognition," 2016 IEEE Conference on Computer Vision and Pattern Recognition (CVPR), Jun. 2016, 9 pp.
He et al., "Mask R-CNN," 2017 IEEE International Conference on Computer Vision (ICCV), Oct. 2017, 9 pp.
He et al., "Multiscale Conditional Random Fields for Image Labeling," Proceedings of the 2004 IEEE Computer Society Conference on Computer Vision and Pattern Recognition (CVPR), Jun. 2004, 8 pp.
Hernandez-Mederos et al., "Sampling Points on Regular Parametric Curves with Control of Their Distribution," Computer Aided Geometric Design, vol. 20, No. 6, Sep. 2003, 20 pp.
Holschneider et al., "A real-time algorithm for signal analysis with the help of the wavelet transform," In Wavelets—Time-Frequency Methods and Phase Space, Springer-Verlag Berlin Heidelberg, May 1989, 14 pp.
Howard et al., "MobileNets: Efficient convolutional neural networks for mobile vision applications," arXiv preprint arXiv: 1704.04861, Apr. 2017, 9 pp.
Huang et al., "The ApolloScape Dataset for Autonomous Driving," 2018 IEEE/CVF Conference on Computer Vision and pattern Recognition Workshops (CVPRW), Jun. 2018, 7 pp.
Jaderberg et al., "Spatial Transformer Networks," Advances in Neural Information Processing Systems, Jun. 2015, 9 pp.
Jeon et al., "Active Convolution: Learning the Shape of Convolution for Image Classification," 2017 IEEE Conference on Computer Vision and Pattern Recognition (CVPR), Mar. 2017, 9 pp.
Kingma-et al., "Adam: A Method for Stochastic Optimization," arXiv: 1412.6980, Dec. 2014, 9 pp.
Kohli et al., "Robust Higher Order Potentials for Enforcing Label Consistency," International Journal of Computer Vision (IJCV), vol. 82, No. 3, Jan. 2009, 23 pp.
Krizhevsky et al., "ImageNet Classification with Deep Convolutional Neural Networks," Advances in Neural Information Processing Systems, vol. 25. No. 2, Jan. 2012, 9 pp.
Ladicky et al., "Associative Hierarchical CRFs for Object Class Image Segmentation," 2009 IEEE 12th International Conference on Computer Vision, Sep. 2009, 8 pp.
LeCun et al., "Convolutional Networks for Images, Speech, and Time Series," The Handbook of Brain Theory and Neural Networks, vol. 3361, No. 10, 1995, 14 pp. (Applicant points out, in accordance with MPEP 609.04(a), that the year of publication, 1995, is sufficiently earlier than the effective U.S. filing date, so that the particular month of publication is not in issue.).
Li et al., "Not All Pixels are Equal: Difficulty-aware Semantic Segmentation Via Deep Layer Cascade," 2017 IEEE Conference on Computer Vision and Pattern Recognition (CVPR), Jul. 2017, 10 pp.
Lin et al., "Microsoft COCO: Common Object in Context," In: Fleet D., Pajdla T,, Schiele B., Tuytelaars T. (eds) Computer Vision—ECCV 2014. European Conference on Computer Vision 2014. Lecture Notes I Computer Science, vol. 8693, May 2014, 16 pp.
Long et al., "Fully Convolutional Networks for Semantic Segmentation," Proceedings of the IEEE Conference on Computer Vision and Pattern Recognition, Mar. 2015, 10 pp.
Marin et al., "Beyond Gradient Descent for Regularized Segmentation Losses," 2019 IEEE/CVF Conference on Computer Vision and Pattern Recognition (CVPR), Jun. 2019, 10 pp.
Marin et al., "Efficient Segmentation: Learning Downsampling Near Semantic Boundaries," 2019 IEEE/CVF International Conference on Computer Vision (ICCV), Oct. 2019, 11 pp.
Newell et al., "Stacked Hourglass Networks for Human Pose Estimation," European Conference on Computer Vision, Jul. 2016, 17 pp.

(56) References Cited

OTHER PUBLICATIONS

Noh et al., "Learning Deconvolution Network for Semantic Segmentation," 2015 IEEE International Conference on Computer Vision (ICCV), Dec. 2015, 9 pp.
Obeidat et al., "An Intelligent Sampling Method for Inspecting Free-form Surfaces," The International Journal of Advanced Manufacturing Technology, vol. 40, Feb. 2009, 12 pp.
Peter et al, "From Optimised Inpaintin,s7, with Linear PDEs Towards Competitive Image Compression Codecs," In T. Braunl, B. McCane, M. Rivera and X. Yu editors. Image and Video Technology, Cham, Springer International Publishing, Feb. 2016, 12 pp.
Recasens et al., "Learning to Zoom: A Saliency-Based Sampling Layer for Neural Networks," Proceedings of the European Conference on Computer Vision (ECCV), Sep. 2018, 16 pp.
Richter et al., "Playing for Benchmarks," 2017 IEEE International Conference on Computer Vision (ICCV), Oct. 2017, 10 pp.
Ronneberger et al., "U-Net: Convolutional Networks for Biomedical Image Segmentation," International Conference on Medical Image Computing and Computer-Assisted Intervention, May 2015, 8 pp.
Ros et al., "The SYNTHIA Dataset: A Large Collection of Synthetic Images for Semantic Segmentation of Urban Scenes," 2016 IEEE Conference on Computer Vision and Pattern Recognition (CVPR), Jun. 2016, 10 pp.
Shirley et al., "Fundamentals of Computer Graphics," 2nd Edition, 2005, 621 pp. (Applicant points out, in accordance with MPEP 609.04(a), that the year of publication, 2005, is sufficiently earlier than the effective U.S. filing date, so that the particular month of publication is not in issue.).
Simonyan et al., "Very Deep Convolutional Networks for Large-Scale Image Recognition," arXiv, No, 1409.1556, Sep. 2014, 10 pp.
Tang et al., "On Regularized Losses for Weakly-supervised CNN Segmentation," Proceedings of the European Conference on Computer Vision (ECCV), Mar. 2018, 16 pp.
Tiller et al., "Knot-removal Algorithms for NURBS Curves and Surfaces," Computer-Aided Design, vol. 24, No. 8, Aug. 1992, 9 pp.
Weston et al, "Deep Learning Via Semi-Supervised Embedding," Neural Networks: Tricks of the Trade, Springer, 2012, 17 pp. (Applicant points out, in accordance with MPEP 609.04(a), that the year of publication, 2012, is sufficiently earlier than the effective U.S. filing date, so that the particular month of publication is not in issue.).
Wu et al., "Wider or Deeper: Revisiting the ResNet Model for Visual Recognition," arXiv, No. 1611.10080, Nov. 2016, 19 pp.
Xia et al., "Zoom Better to See Clearer: Human and Object Parsing with Hierarchical Auto-Zoom Net," European Conference on Computer Vision (ECCV), Mar. 2016, 19 pp.
Yu et al., "Multi-Scale Context Aggregation by Dilated Convolutions," arXiv, No. 1511.07122, Nov. 2015, 9 pp.
Zhao et al., "ICNet for Real-time Semantic Segmentation on High-Resolution Images," arXiv, No. 1704.08545, Apr. 2017, 9 pp.
Zhao et al., "Pyramid Scene Parsing Network," 2017 IEEE Conference on Computer Vision and Pattern Recognition (CVPR), Jul. 2017, 10 pp.
Andrienko, O., "ICNet and PSPNet-50 in Tensorflow for real-time semantic segmentation," retrieved from https://github.com/oandrienko/fast-semantic-segmentation on Jun. 18, 2020, 4 pages.
"Caffe2: A New Lightweight, Modular, and Scalable Deep Learning Framework," retrieved from https://research.fb.com/downloads/caffe2/ on Jun. 18, 2020, 4 pp.
Google AI Blog—"Announcing Open Images V5 and the ICCV 2019 Open Images Challenge," May 8, 2019, retrieved from https://ai.googleblog.com/2019/05/announcing-open-images-v5-and-iccv-2019.html, on Jun. 17, 2020, 3 pp.
"Releasing 'Supervisely Person' dataset for teaching machines to segment humans," Mar. 2018, 12 pp. retrieved from haps://hackernoon.com/releasing-supervisely-person-dataset-for-teaching-machines-to-segment-humans-1f1fcif28469 on Jun. 18, 2020.
"SciPy is open-source software for mathematics, science, and engineering," retrieved from haps://docs.scipy.org/doc/scipy/reference/generated/scipy.interpolate.griddata.html on Jun. 18, 2020, 4 pp.

\* cited by examiner

CONTENT-ADAPTIVE NON-UNIFORM IMAGE DOWNSAMPLING USING PREDICTIVE AUXILIARY CONVOLUTIONAL NEURAL NETWORK

This application claims the benefit of U.S. Provisional Patent Application No. 62/776,314, filed Dec. 6, 2018, the entire contents of which are incorporated herein by reference.

TECHNICAL FIELD

The disclosure relates to computer vision systems, including computing systems for semantic segmentation of image data.

BACKGROUND

Various devices, systems, and computing platforms process digital images and video. In some examples, computing systems may apply semantic segmentation and object detection to analyze and process digital images and video.

SUMMARY

In general, this disclosure describes techniques for content-adaptive downsampling of digital images and videos for computer vision operations, such as semantic segmentation. The techniques may be applied in applications and automated processes, such as autonomous vehicles, auto-piloting, navigation, security, imaging and other systems. The content-adaptive downsampling techniques described herein may, for example, be particularly useful for performing semantic segmentation to process image data. For example, to speed up performance of semantic segmentation, some systems may conventionally apply downsampling with uniform sampling techniques to input frames of digital image data. However, as further discussed below, such techniques provide reduced accuracy at semantic boundaries compared with the techniques described herein.

In general, the content-adaptive downsampling techniques described herein involves sampling pixels of image data non-uniformly. As one example, the content-adaptive downsampling techniques herein may reduce resolution for larger objects while increasing the resolution of smaller objects, thereby equalizing (as one example) the size of objects in the downsampled image. By equalizing the size of objects in the downsampled image, the techniques may simplify learning for machine learning applications. In some examples, the content-adaptive downsampling technique may sample more pixels around semantic boundaries, thereby reducing quantization effects on the boundaries. As one example implementation, a computing system perform content-adaptive downsampling by performing content-aware non-uniform downsampling, segmentation, and upsampling.

In one example, a computer vision system comprises a memory, one or more processors operably coupled to the memory and a downsampling module configured for execution by the one or more processors to downsample, based on a non-uniform sampling model that is trained to predict content-aware sampling parameters, input image data to generate downsampled image data. A segmentation module is configured for execution by the one or more processors to segment on the downsampled image to produce a segmentation result, such as a feature map that assigns pixels of the downsampled image data to object classes. An upsampling module is configured for execution by the one or more processors to perform upsampling according to the segmentation result to produce upsampled image data. In one example, the downsampling module comprises a neural network configured to compute content-aware sampling parameters as a set of sampling locations that specify spatial coordinates for semantic boundaries between objects within the input image data for target classes.

In another example, a method comprises downsampling, based on a non-uniform sampling model, input image data to generate downsampled image data. The method includes segmenting the downsampled image data to generate a segmentation result; and upsampling the segmentation result to upsampled image data.

In another example, a computer-readable medium comprises instructions that configure a processor to execute an auxiliary neural network according to a non-uniform sampling model trained to predict content-aware sampling parameters for input image data, wherein the sampling parameters specify spatial coordinates for semantic boundaries between objects within the input image data for one or more target classes. The computer-readable medium further comprises instructions to configure the processor to execute a segmentation neural network to downsample, according to the predicted sampling parameters, the input image data to generate downsampled image data, segment the downsampled image data to generate a segmentation result; and upsample the segmentation result to upsampled image data.

The techniques described herein provide one or more technical advantages. For example, by sampling pixels of a digital image or video non-uniformly, computation resources for preforming image processing tasks may be reduced by using downsampled image data while nevertheless retaining accuracy (e.g., at object boundaries and of finer details within the image data).

Although the techniques are described with respect to semantic segmentation, the non-uniform, content-adaptive sampling techniques described herein are applicable to any computer vision applications and operations, such as instance segmentation, semantic segmentation, depth estimation and other operations where accuracy at finer details and edges can be critical.

DETAILED DESCRIPTION

Figure 1:
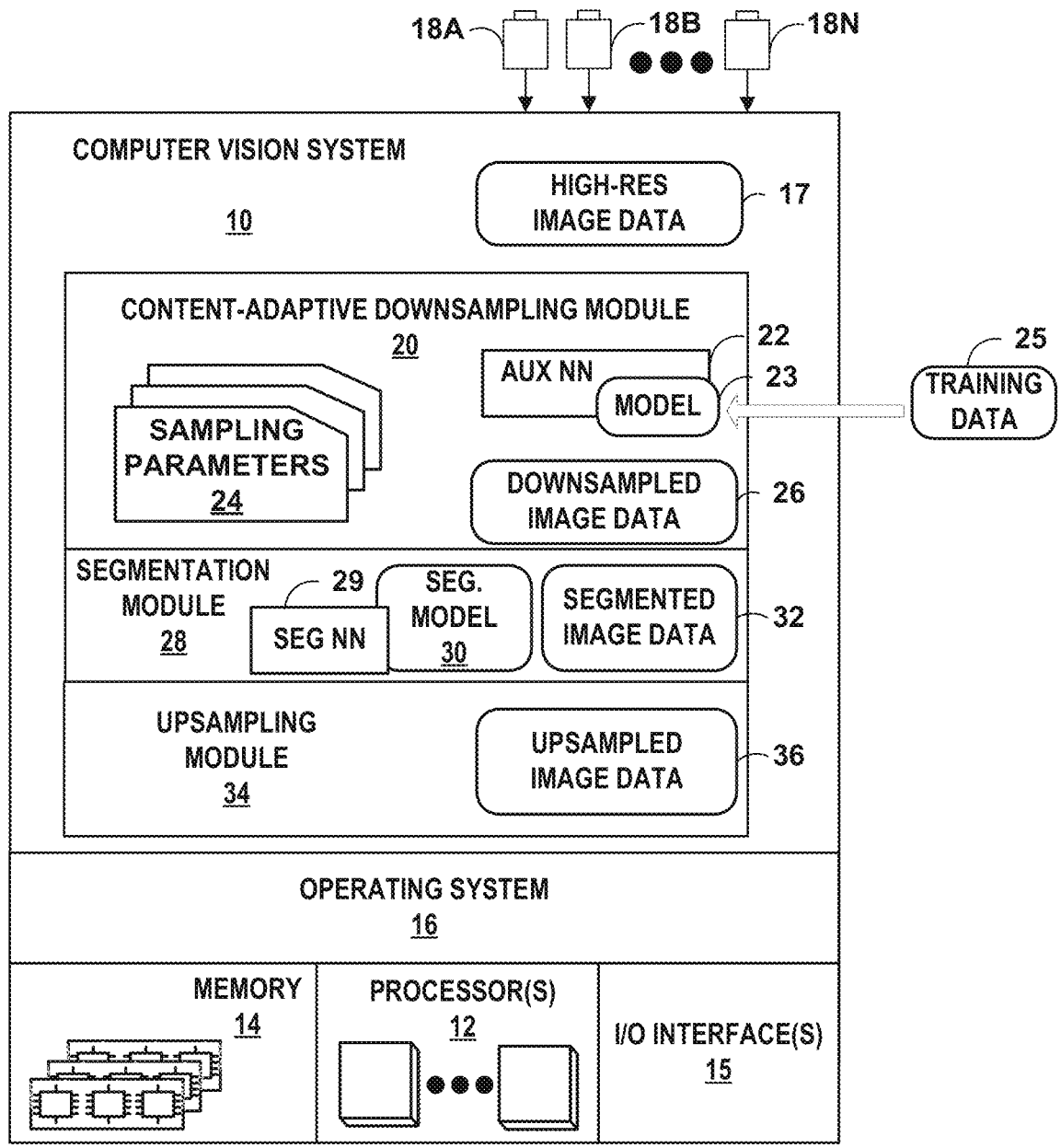
FIG. 1 is block diagram illustrating one example implementation of a computer vision system having a content-adaptive, non-uniform downsampling module in accordance with the techniques described herein.

In general, downsampling image data (e.g., an image frame and/or video data may be performed to increase the speed and/or decrease the computational resources necessary to apply one or more subsequent operations on the image data. Conventional uniform downsampling techniques, such as bilinear interpolation, may achieve increased speed but can result in several problems. For example, uniform downsampling techniques preserve the different, relative sizes of the objects (segments) within the image data, which complicates subsequent processing of the image data for object recognition. Moreover, uniform sampling techniques tend to quantize the boundary of objects within the digital image or video, thereby complicating localization of boundaries on the digital image or video for subsequent processing.

To address these and other technical problems, content-aware, non-uniform sampling systems and techniques as described herein that, as one example, may be applied by a computer vision system prior to semantic segmentation to reduce computation and/or increase speed while retaining accuracy during the segmentation and subsequent upsampling. Further, the non-uniform sampling techniques described herein account for scale variation of objects within the image data via reducing the portion of the downsampled image occupied by larger segments and increasing that of smaller segments. Thus, the scale equalizing effect of the adaptive downsampling described herein may, as a result, simplify machine learning for image processing tasks, especially those that rely on deep learning-based computer-vision. As shown herein, the techniques sample tend to sample an increased number of pixels inside an object of interest, while uniform downsampling techniques may fail to detect the object all together.

In accordance with the techniques described herein, a computer vision system includes a content-adaptive downsampling module that samples pixels of a digital image or video non-uniformly. To apply the content-adaptive downsampling technique, the computing system may perform non-uniform downsampling, segmentation, and upsampling. To perform non-uniform downsampling, the computing system may determine one or more parameters of a non-uniform grid and may generate, based on the one or more parameters, a downsampled image. As one example, the one or more parameters are generated by an auxiliary convolutional neural network (CNN) that learns from a non-uniform sample model that accounts for semantic edges. That is, the non-uniform downsampling may produce a finer sampling in the vicinity of semantic boundaries.

As used herein, the term semantic boundary refers to the boundary between semantic segments. In terms of pixels within an image, a semantic boundary is the set of pixels of one semantic category adjacent to pixels of another semantic category. In this way, a semantic boundary divides image data segments of different semantic categories. In contrast, edges within image data are necessarily places of high contrast between neighboring pixels. As described herein, computer vision systems utilize content-adaptive downsampling by detecting semantic categories of objects/features. Edge detection-based systems, in contrast, apply only low-level image manipulation operations to detect changes in contrast, which does not make use of semantic understanding of the content of an image. In some cases, a semantic boundary may coincide with edges because pixels of different categories tend to be of different color (high contrast), however many edges may exist in a given image that do not correspond to semantic boundaries between objects (e.g. edges of stripes on a zebra or flag).

FIG. 1 is block diagram illustrating one example implementation of a computer vision system 10 that includes content-adaptive downsampling module 20 trained to sample pixels within image data 17 near semantic boundaries of one or more target object classes in accordance with the techniques described herein.

In general, computer vision system 10 receives and processes image data 17 captured, for example, by one or more image capture devices 18A-18N. Image capture devices 18 may, for example, represent one or more cameras, line scanners, infrared scanners, radar devices, imaging devices or any other device cable of generating image data. Moreover, in some examples, image capture devices 18 may be collocated with (e.g., integrated within) computer vision system 10. In other devices, computer vision system 10 receives image data 17 from one or more other devices or repositories. In FIG. 1, image data 17 is referred to, in this example, as high-resolution image data in that computer vision system 10 downsamples input image data 17 so as to perform one or more tasks, such as semantic segmentation in which the image data is segmented near semantic boundaries within the image data.

As shown in FIG. 1, computer vision system 10 includes content-adaptive downsampling module 20 configured to down sample image data 17 to generate downsampled image data 26 for application of one or more subsequent image processing operations. As described herein, content-adaptive downsampling module 20 provides adaptive downsampling with accurate representation of targeted semantic boundaries.

In this example, content-adaptive downsampling module 20 includes an auxiliary neural network 22 configured to operate according to neural network model 23 trained via training data 25. That is, neural network 23 learns, based on training data 25, to apply content-adaptive sampling to sample pixels within image data 17 near semantic boundaries for one or more target object classes. For example, as a component of an autonomous vehicle system, computer vision system 10 may train auxiliary neural network 22 to perform content-adaptive downsampling near semantic boundaries for target classes of traffic signs, construction signs, cars, motorbikes, bicycles, persons, riders, trucks, buses and tricycles. In general, training data 25 for semantic image segmentation may consists of two parts: the first is the number of 2D images, the second part is labeling masks for all of the images in the first part. The labeling of an image within training data 25 consists of category assignment for each pixel in the image according to a fixed number of different categories known in advance. In some cases, a small portion of the pixels may be marked 'unlabeled'.

As further described herein, once trained according to training data 25 having labelled semantic boundaries, auxiliary neural network 22 operates to apply model 23 to directly predict sampling parameters 24 to be used for downsampling image data 17 without predicting semantic boundaries within input image data 17. That is, auxiliary neural network 22 utilizes machine learning based on semantic boundaries to operate according a trained model 23 so as to compute sampling parameters 24 as, in one example, a set of sampling locations used for subsequently downsampling image data 17. In such examples, sampling parameters 24 may specify the sampling locations as sampling tensor of spatial coordinates within the image data at the original resolution, and the number of sampling locations (i.e., the size of the tensor) defines the downsampled resolution. In this way, semantic boundaries are used only during training of auxiliary neural network 22 to generate ground truth data such that, once deployed, the auxiliary neural network 22 need not predict or compute semantic boundaries for input image data 17. Instead, auxiliary neural network 22 is able to predict sampling locations directly for input image data 17.

Compared to other machine learning components of computer vision system 10, auxiliary neural network 22 may be a relatively small auxiliary network trained to predict the sampling tensor without explicitly predicting boundaries. In various examples, model 23 is trained to balance between two competing objectives: (1) producing finer sampling in the vicinity of semantic boundaries, (2) ensuring that any distortions due to the non-uniformity does not preclude successful segmentation of the non-uniformly downsampled image. In this way, the techniques of the present disclosure do not rely on detection of edges within the image data when predicting sampling locations. Instead, the present techniques enable machine learning based on semantic boundaries to predict sampling locations. Adaptive sampling may also be employed in curve and surface approximations and splines reduction. In one example discussed in detail in reference to FIG. 8, auxiliary neural network 22 may be arranged as two U-Net sub-networks stacked together.

Content-adaptive downsampling module 20 operates according to sampling parameters 24 computed by auxiliary neural network 22 to then downsample image data 17 to generate downsampled image data 26 for application of one or more subsequent image processing operations. In one example, auxiliary neural network 23 is a convolutional neural network (CNN) that computes downsampling parameters 24 that learns from a non-uniform sample geometric model driven by semantic boundaries. Auxiliary neural network 22 may, in some examples, improve segmentation performance while keeping any added cost low, providing a better cost-performance balance than conventional techniques.

As one example, computer vision system 10 includes a segmentation module 28 having a segmentation neural network 29 that operates as image-classification network to apply segmentation model 30 to segment downsampled image data 26 to produce segmented image data 32. In general, semantic segmentation of image data may require class assignment for each pixel, where each class represents a different type of object, also referred to as feature. In some examples, segmentation neural network 29 is a convolutional neural network having layers trained to classify the pixel data of downsampled image data 26 by generating segmented image data 32 as a feature map 33 (also referred to herein as a segmentation map) that identifies pixel locations for features (objects) within downsampled image data 26. As a feature map, segmented image data 32 may, for example, provide a class assignment for each pixel within image data 17, where the class assignments for a given pixel assigns the pixel to one of a set of object classes, thereby segmenting image data 17 into groups (regions) of pixels with each of the different regions of pixels being assigned to a respective class. Segmentation module 32 may ultimately produce a final score map of the same size as downsampled image data 26. In some examples in accordance with this disclosure, adaptive downsampling applied by content-adaptive downsampling module 20 may be used with any off-the-shelf segmentation model 30 as the techniques described herein to not place any constraints on the base segmentation model. As described further below, experimental results indicate improved technical results with base multiple models (U-Net, PSP-Net and Deeplabv3+).

Upsampling module 34 processes segmented image data 32 to produce upsampled image data 36 of a desired resolution, such as the original resolution. In some examples, upsampling module 34 processes the feature map (segmented image data 32) generated by segmentation module 30 to recover a feature map that specifies the locations of the features (objects) at a higher pixel resolution (e.g., the original resolution). Moreover, as further explained below (see, e.g., FIG. 4), upsampling 34 may be configured to perform content-adaptive upsampling according to sampling parameters 24 predicted by auxiliary neural network 22 of downsampling module 20.

In the example of FIG. 1, computer vision system 10 includes one or more processors 12, memory 14 and an operating system 16, and that provide a computing platform for executing a development suite having one or more software components 17. Processors 12 are coupled to one or more I/O interfaces 15, which provides one or more I/O interfaces for communicating with external devices, such as a keyboard, display devices, sensors, and the like. Moreover, the one or more I/O interfaces 15 may include one or more wired or wireless network interface controllers (NICs) for communicating with a network, such as network 104. Each of processors 12 may comprise any one or more of a multi-core processor, a controller, a digital signal processor (DSP), an application specific integrated circuit (ASIC), a field-programmable gate array (FPGA), or equivalent discrete or integrated logic circuitry. Memory 14 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Various devices and systems may benefit from nonuniform downsampling by incorporating the example content-adaptive sampling techniques and components of the present disclosure. As examples, the techniques may be applied in applications and automated processes, such as autonomous vehicles, auto-piloting, navigation, security, imaging and other systems.

Figure 2:
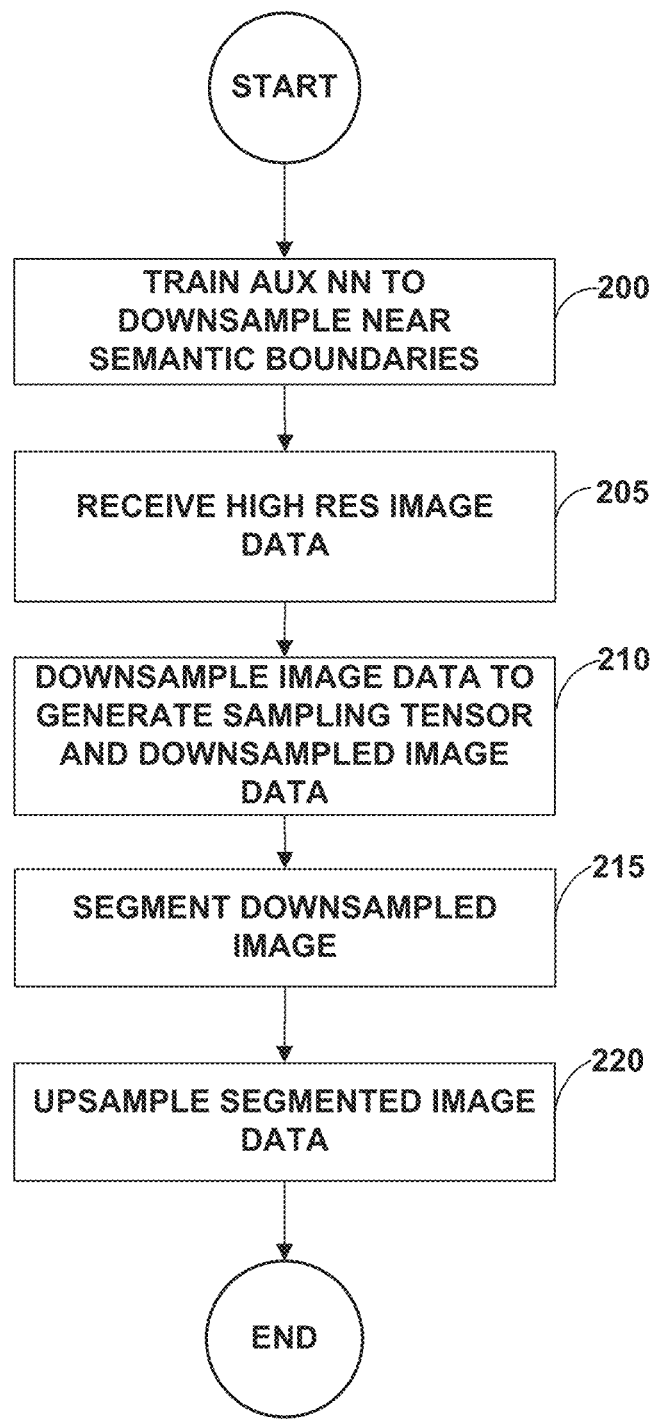
FIG. 2 is a flowchart illustrating example operation of the computer vision system in accordance with the techniques described herein.

FIG. 2 is a flowchart illustrating example operation of computer vision system 10 in accordance with the techniques described herein.

Initially, computer vision system 10 receives training data 25 and trains model 23 of auxiliary neural network 22 with the training data so as to learn to select an increased number of pixel around semantic boundaries of target object classes as compared with pixel that are not near semantic boundaries separating objects (200).

In operation, computer vision system 10 receives input image data 17 having a pixel resolution, referred to, for example purposes, as a high resolution (205). Next, auxiliary neural network 22 operates according to trained non-uniform sampling model 23 to process input data 17 to predict content-aware downsampling parameters 24 for input image data 17 (210). In one example, auxiliary neural network 22 generates sampling parameters 24 to specify predicted spatial coordinates within input image data 17 for semantic boundaries between objects within the input image data for one or more target object classes.

Next, content-adaptive downsampling module 20 applies predicted sampling parameters 24 to process input image data to generate downsampled image data (215). For example, content-adaptive downsampling module 20 may downsample input image data 17 by applying downsampling parameters 24 to downsample pixels of input image data 17 along the predicted semantic boundaries at a higher sampling resolution than a sampling resolution downsampling module 20 uses for pixels that are not along the predicted semantic boundaries.

Segmentation module 28 segments downsampled image data 32 to generate a segmentation result (220). For example, segmentation module 28 may segment downsampled image data 32 by generating a feature map that assigns each pixel (by spatial location) within the downsampled image data to respective object class. Moreover, by utilizing downsampled image data 26, segmentation module 28 constructs the feature map to have a pixel resolution the same as the downsampled image data, i.e., less than a pixel resolution of input image data 17.

Upsampling module 34 upsamples the segmentation result to produced upsampled image data 36 (225). For example, upsampling module 34 may generate upsampled image data 36 by generating an upsampled feature map that specifies pixel locations of the objects at a pixel resolution higher than the resolution of the downsampled image data, e.g., at a pixel resolution equal to the pixel resolution of input image data 17.

Figure 3A:
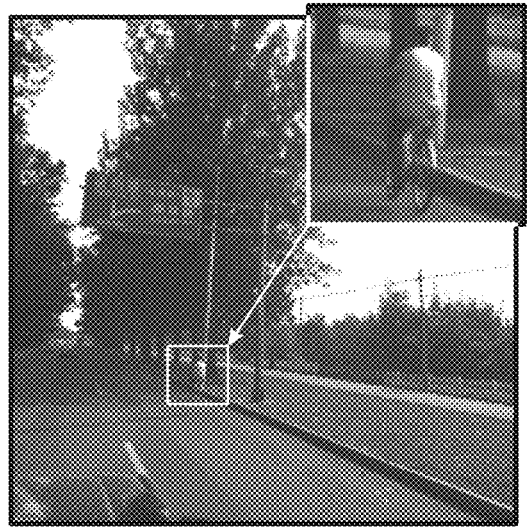
FIGS. 3A-3D are illustrations depicting an example application of the content-adaptive downsampling techniques by a computer vision system.
Figure 3B:
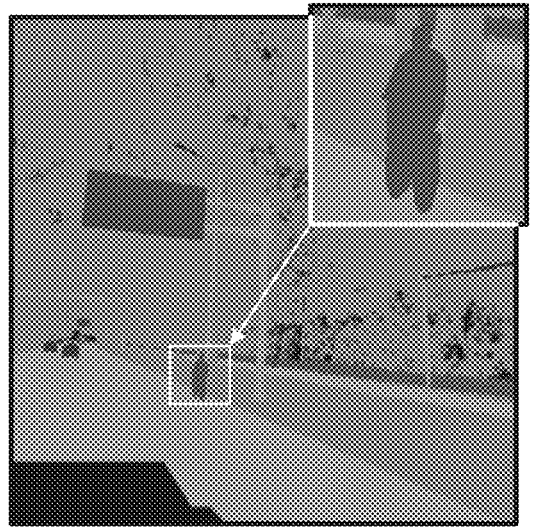
Figure 3C:
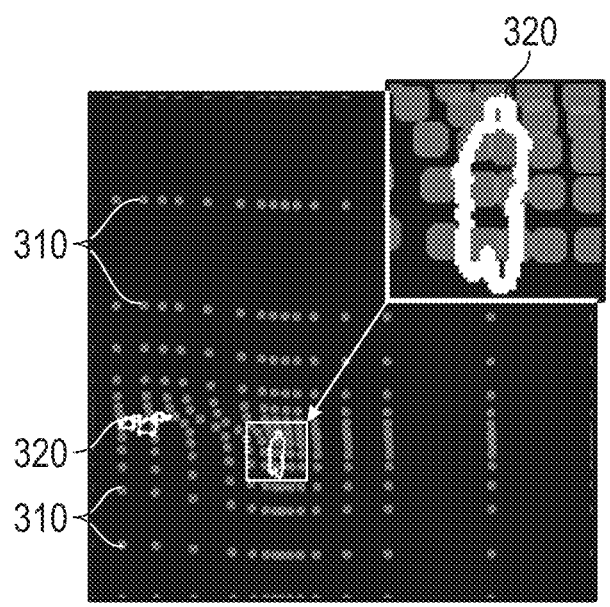
Figure 9:
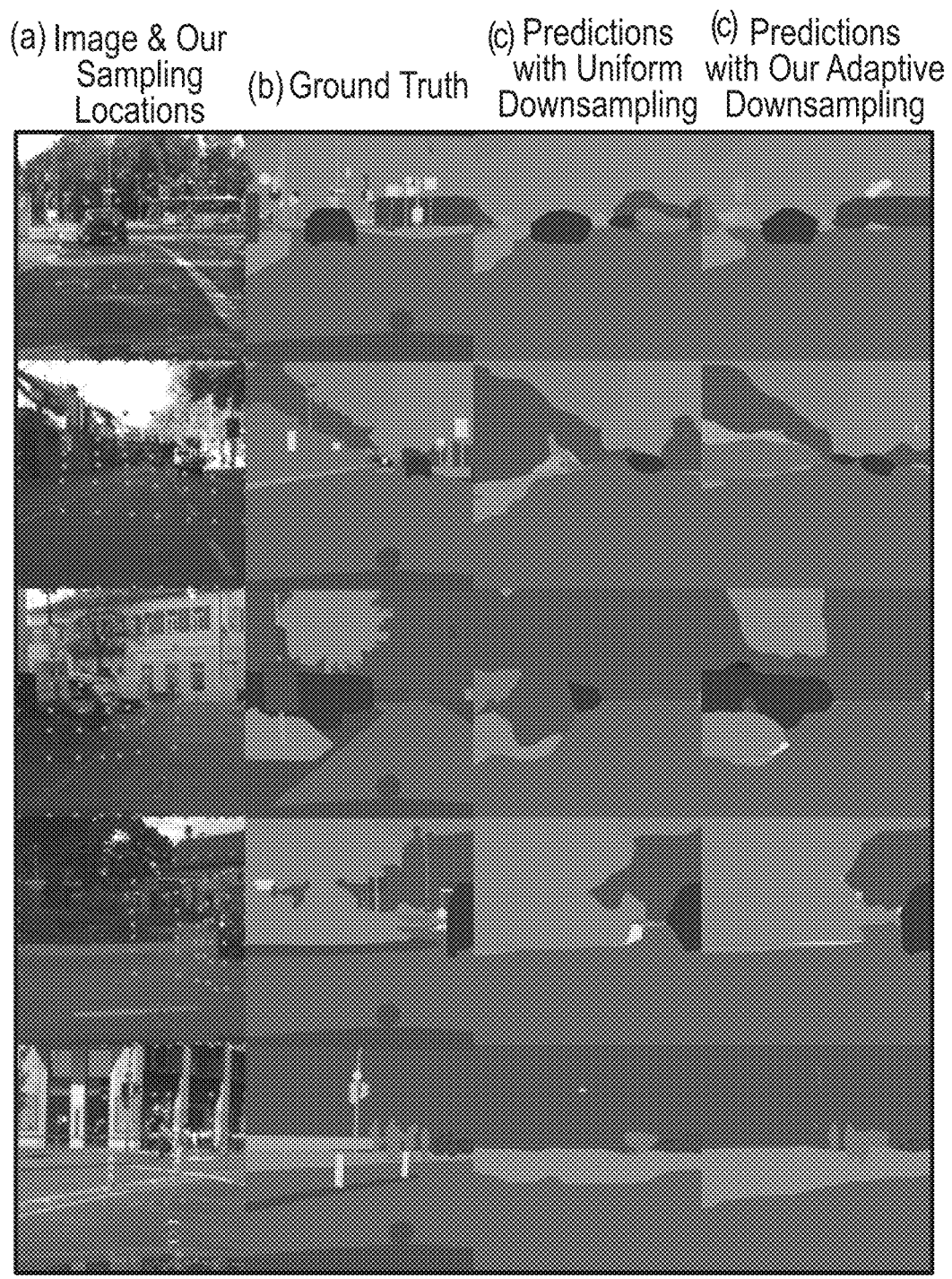
FIG. 9 is a set of images showing experimental results.

FIGS. 3A-3D are example images illustrating the content-adaptive downsampling techniques described herein when applied by computer vision system 10 to an example input high-resolution image 300. For example, FIG. 3A depicts an example original 2710×2710 image 300 received by computer vision system 10 as input image data 17. FIG. 3B illustrates ground truth labels (i.e., example labelled data) for training neural network 22. Given the ground truth depicted in FIG. 3B, a non-uniform grid of sampling locations 310, as depicted in FIG. 3C, may be generated for use as training data 25. As shown in FIG. 3, sampling locations 310 are more highly concentrated toward semantic boundaries of target classes 320 FIG. 3C. That is, in this example, the rows and columns of the grid of sampling locations are more closely spaced in terms of spatial pixel locations. Sampling locations 310 may be used as training data 25 for training auxiliary neural network 22 of content-adaptive downsampling module 20 to automatically produce such sparsely sampled locations for other images having similar target class as original input image 300. Classification of the sampling locations (dots 330 in FIG. 3D) may be produced by segmentation NN 29 of segmentation module 28, which may be a separately trained efficient low-res segmentation CNN. Concentration of sparse classifications near boundaries of target classes may improve accuracy of interpolation (FIG. 3D) compared to uniform sampling (FIG. 9).

The techniques of this disclosure, including non-uniform downsampling over uniform downsampling, may provide several technical advantages. As one example, uniform downsampling may complicate accurate localization of boundaries in the original image. For example, assuming N uniformly sampled points over an image of diameter D, the distance between neighboring points may define a bound for the segmentation boundary localization errors $$o\left(\frac{D}{\sqrt{N}}\right).$$

In contrast, examples described further below indicate that the error bound decreases significantly faster with respect to the number of sample points $$o\left(\frac{xl^2}{N^2}\right)$$

assuming they are uniformly distributed near the segment boundary of max curvature x and length l. The non-uniform boundary-aware sampling techniques of this disclosure may include selecting more pixels around semantic boundaries, thereby reducing quantization errors on the boundaries.

Figure 3D:
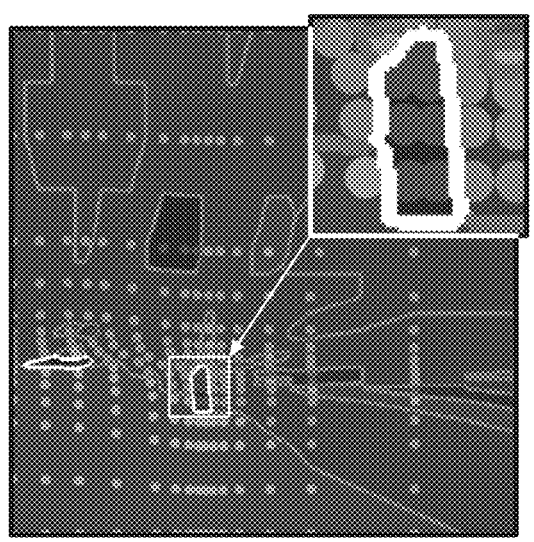

Second, the example non-uniform sampling techniques of this disclosure account for scale variation by reducing the portion of the downsampled image occupied by larger segments, and increasing that of smaller segments. In some examples, the presence of the same object class at different scales may complicate automatic image understanding. Thus, the scale-equalizing effect of the adaptive downsampling techniques of the present disclosure may simplify learning. As shown in FIGS. 3C and 3D, techniques of this disclosure may include sampling many pixels inside a target class of objects (i.e., the cyclist in this example), while the uniform downsampling may miss that object all together within a given input image.

Experimental results are discussed below in which the content-adaptive downsampling techniques described herein were applied to semantic segmentation. As discussed below, the experimental results demonstrated consistent technical improvements for many different architectures and datasets.

Boundary-Driven Adaptive Downsampling

Figure 4:
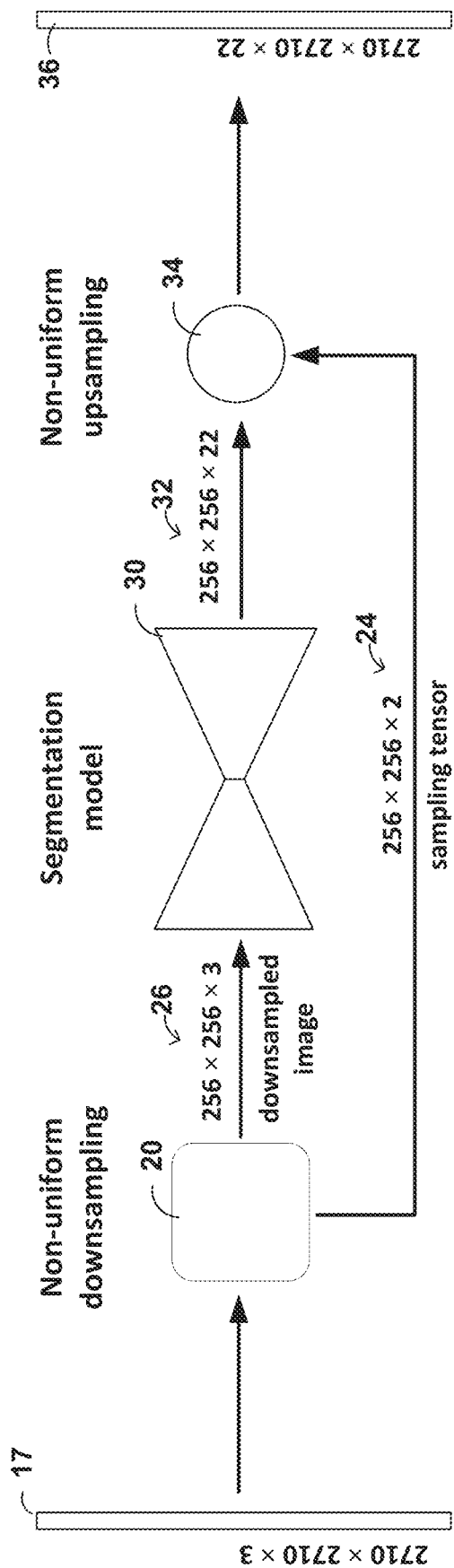
FIG. 4 is an illustration depicting one example segmentation architecture with adaptive downsampling in accordance with the techniques described herein.

FIG. 4 is a block diagram providing a high-level illustration of computer vision system 10 having an efficient segmentation architecture with adaptive downsampling. In this example, content adaptive downsampling module 20 takes a high-resolution image 17, determines nonuniform sampling locations and outputs sampling parameters 24 (e.g., a sampling tensor of sampling locations) and downsampled image data 26. Then, the downsampled image may be segmented by segmentation module 28 applying a standard segmentation model 30. Finally, the resultant segmented image data 32, which may be a feature map, is upsampled (e.g., using interpolation) by upsampling module 34 to produce upsampled image data 36 at the original resolution, e.g., to recover segmenation at the original resolution. As such, auxiliary NN 22 of content-adaptive downsampling module 20 may, for example, comprise an efficient CNN that reproduces adaptive downsampling and achieves accurate representation of targeted semantic boundaries.

Examples of this disclosure are described below using the following notation. Consider a high-resolution image $I=\{I_{ij}\}$ of size H×W with C channels. Assuming relative coordinate system, all pixels have spatial coordinates that form a uniform grid covering square $[0; 1]^2$. Let I[u,v] be the value of the pixel that has spatial coordinates closest to (u, v) for u, v∈[0, 1]. Consider tensor $\phi \in [0, 1]^{2 \times h \times \omega}$. Elements of $\phi$ may be denoted by $$\phi_{ij}^c$$

for c∈{0,1}, i∈{1, 2, . . . , h}, j∈{1, 2, . . . , ω}. Such tensors may be referred to as "sampling tensors." Let $\phi_{ij}$ be the point $(\phi_{ij}^0, \phi_{ij}^1)$. FIG. 3C shows an example of such points.

The sampling operator $$\mathbb{R}^{C \times H \times W} \times [0,1]^{2 \times h \times w} \to \mathbb{R}^{C \times h \times w}$$

maps a pair of image I and sampling tensor $\phi$ to the corresponding sampled image $J=J_{ij}\}$ such that $$J_{ij} := I[\phi_{ij}^0, \phi_{ij}^1] \quad (1)$$

The uniform downsampling may be defined by a sampling tensor $u \in [0, 1]^{2 \times h \times \omega}$ such that $u_{ij}^0 = (i-1)/(h-1)$ and $u_{ij}^1 = (j-1)/(\omega-1)$.

In some examples, non-uniform sampling model 23 in accordance with this disclosure is configured in a manner that balances between two competing objectives: (1) to produce finer sampling in the vicinity of semantic boundaries; and (2) the distortions due to the non-uniformity should not preclude successful segmentation of the non-uniformly downsampled image.

Assume for image I (FIG. 3A) there are ground truth semantic labels (FIG. 3B). A boundary map (white in FIG. 3C) may be computed from the semantic labels. Then, for each pixel, the closest pixel on the boundary may be computed. Let $b(u_{ij})$ be the spatial coordinates of a pixel on the semantic boundary that is the closest to coordinates $u_{ij}$ (distance transform). An example content-adaptive non-uniform downsampling may be defined as sampling tensor $\phi$ minimizing the energy:

$$E(\phi) = \sum_{i,j} \|\phi_{ij} - b(u_{ij})\|^2 + \lambda \sum_{\substack{|i-i'|+\\|j-j'|=1}} \|\phi_{ij} - \phi_{i'j'}\|^2 \quad (2)$$

subject to covering constraints:

$$\phi \in [0,1]^{2 \times h \times w}$$

$$\phi_{1j}^0 = 0 \ \& \ \phi_{hj}^0 = 1, \ 1 \le j \le w,$$

$$\phi_{i1}^1 = 0 \ \& \ \phi_{iw}^1 = 1, \ 1 \le i \le h. \quad (3)$$

Figure 5:
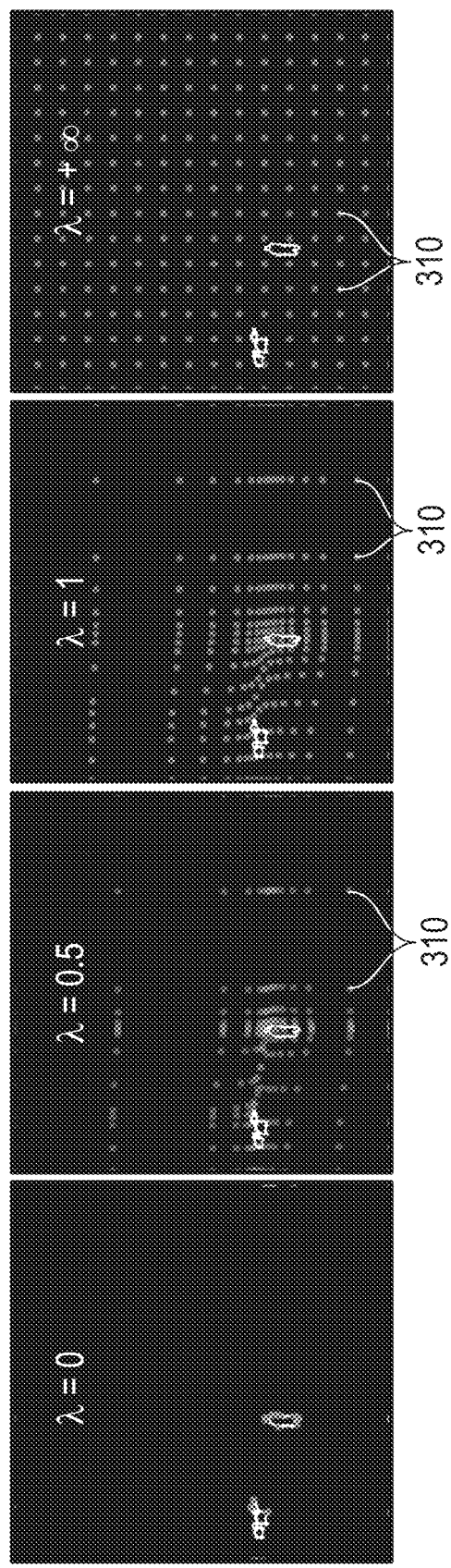
FIG. 5 is an illustration depicting boundary-driven sampling in accordance with the techniques described herein.

The first term in (2) ensures that sampling locations are close to semantic boundaries, while the second term ensures that the spatial structure of the sampling locations is not distorted excessively. The constraints provide that the sampling locations cover the entire image. This least-squares problem with convex constraints can be efficiently solved globally via a set of sparse linear equations. Dots 310 in FIGS. 3C and 5 illustrate solutions for different values of λ. For example, FIG. 5 is an illustration depicting boundary-driven sampling for different λ in (2). Extreme λ sample either semantic boundaries (left) or uniformly (right). Middle-range λ yield in-between sampling.

Figure 6:
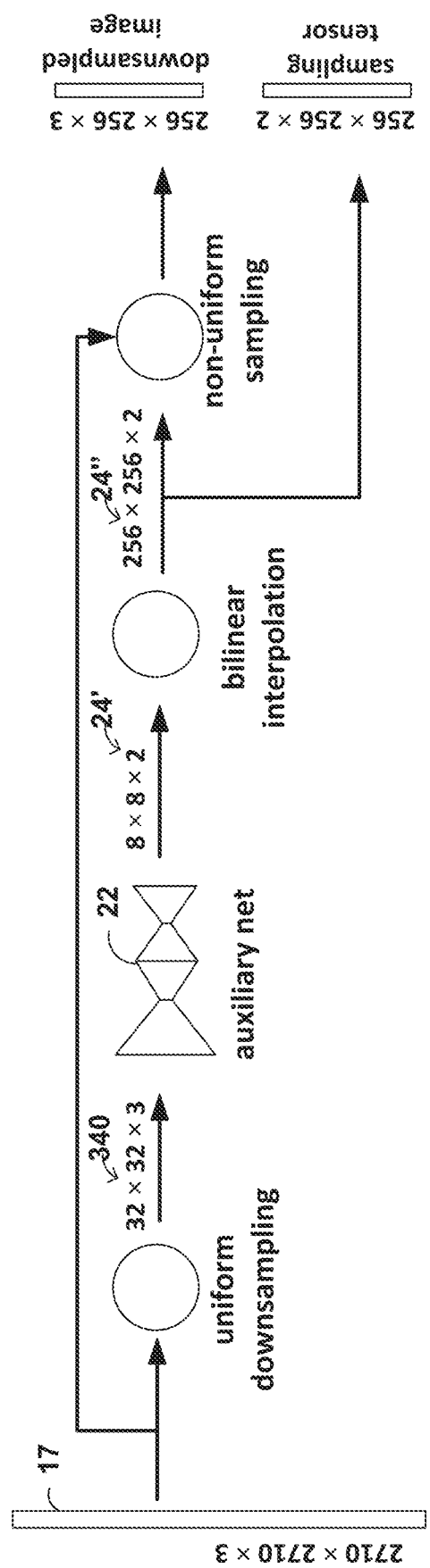
FIG. 6 is an illustration depicting an example architecture of a content-adaptive downsampling module.
Figure 7:
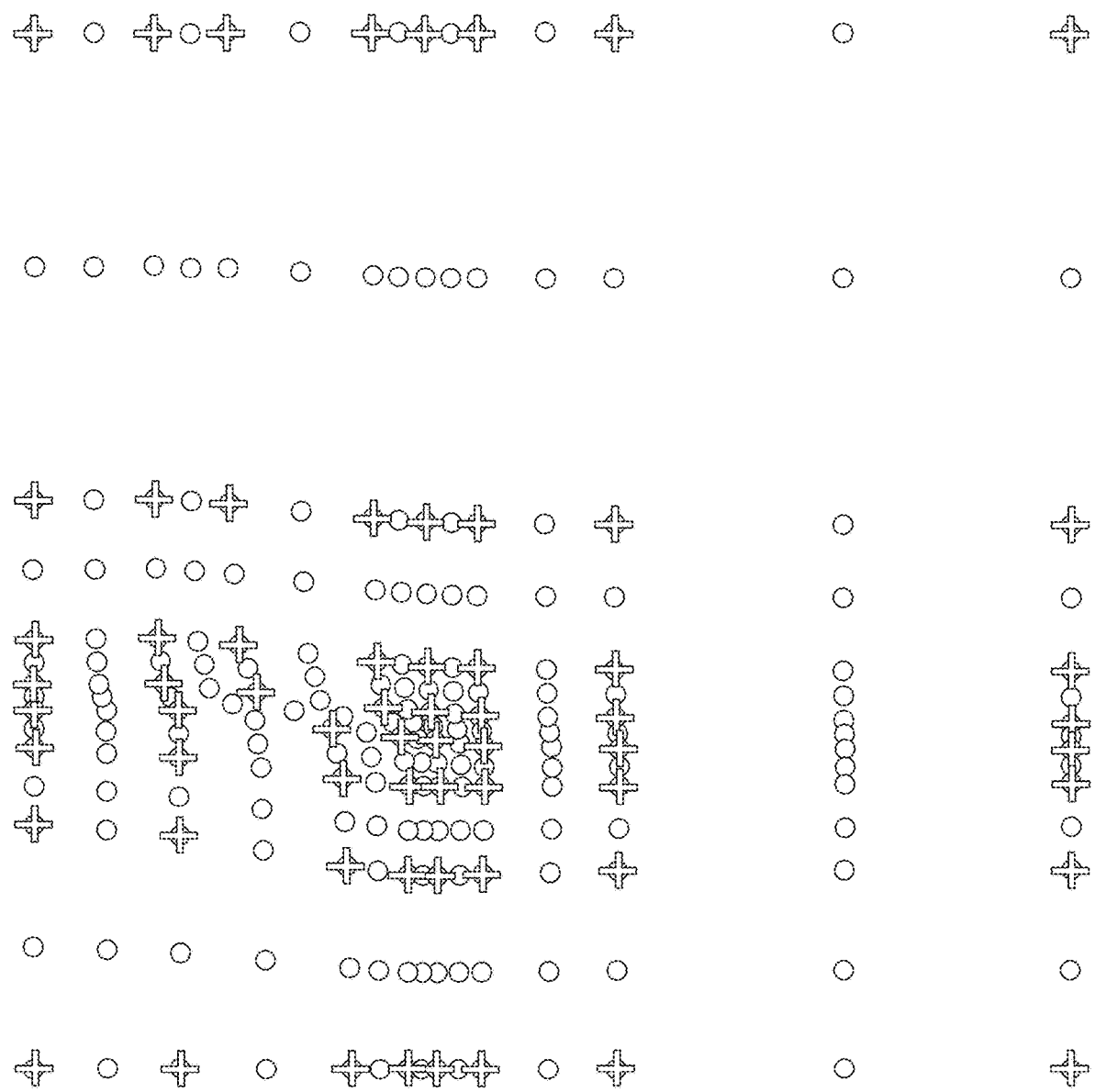
FIG. 7 depicts an example sampling tensor of 8×8 sampling locations (crosses) produced by an auxiliary network and the result of resizing the corresponding sampling tensor by the factor of 2 (points) via bilinear interpolation.

FIG. 6 shows the architecture of an example content-adaptive downsampling module 20. As shown in FIG. 6, a high-resolution image data 17 (e.g. 2710×2710 image) may be uniformly downsampled to a small image 340 (e.g. 32×32) and then processed by auxiliary network 22 producing sampling locations stored in a sampling tensor 24'. This tensor 24' may be resized to tensor 24" and then used for non-uniform downsampling. For example, FIG. 7 depicts an example sampling tensor 24' of 8×8 sampling locations (crosses) produced by auxiliary network 22 and the resultant sampling tensor 24" (dots) by resizing the corresponding sampling tensor 24' by the factor of 2 via bilinear interpolation (FIG. 6).

In this way, once auxiliary neural network 22 computes sampling parameters 24 (e.g., a sampling tensor), original image data 17 may be downsampled by content-adaptive downsampling module 20 via sampling operator (1). Application of sampling tensor $\phi$ (labelled 24') of size (2, h, ω) may yield a sampled image data 26 of size h×ω. If this is not the desired size h'×ω' of downsampled image, content-adaptive downsampling module 20 can employ $\phi$ for sampling. To that end, a new sampling tensor $\phi$ (labelled 24") of shape (2, h', ω') can be obtained by resizing $\phi$ using bilinear interpolation (FIG. 7).

In accordance with some examples of this disclosure, a relatively small auxiliary network 22 may be trained to predict the sampling tensor (sampling parameters 24) without boundaries. Auxiliary network 22 may, for example, be significantly smaller than the segmentation model 30 and segmentation neural network 29 as, in some examples auxiliary neural network 22 is trained to solve a less complex problem than segmentation neural network 29. Auxiliary network 22 is trained with training data 25 to learn cues indicating presence of the semantic boundaries. For example, the vicinity of vanishing points within image data may be more likely to contain many small objects (and their boundaries). Also, any small mistakes by auxiliary network 22 in predicting the sampling locations may not be critical as the final classification decision is left for the segmentation network 29.

Figure 8:
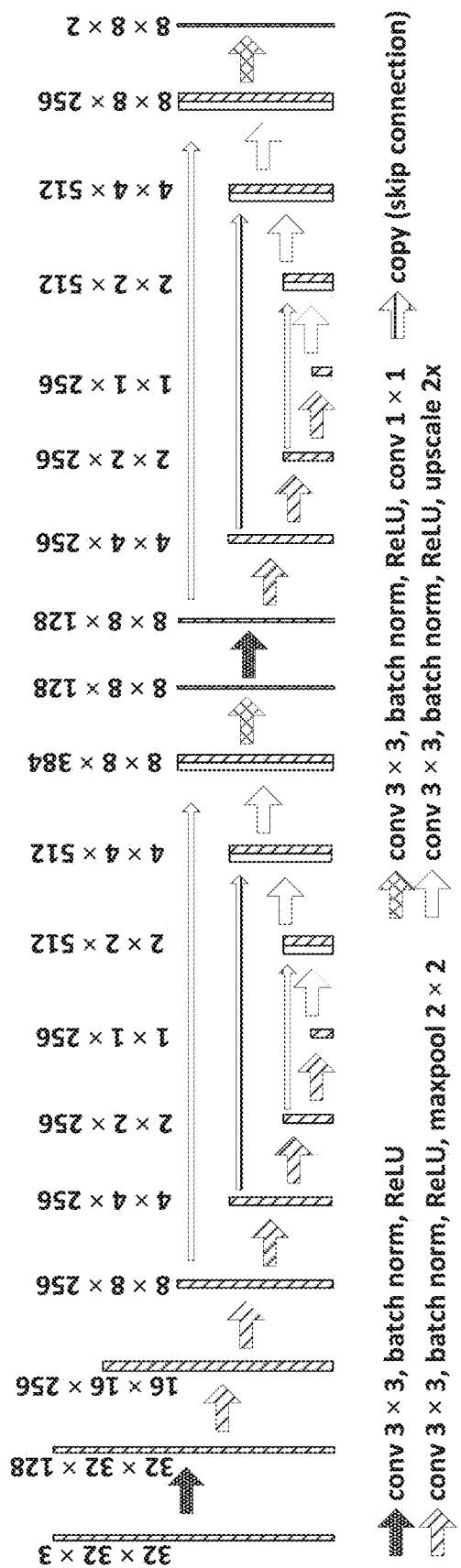
FIG. 8 depicts a double U-Net model for predicting sampling parameters.

FIG. 8 illustrates one example configuration of auxiliary neural network 22 of content-adaptive downsampling module 20 for predicting sampling parameters. In this example, auxiliary neural network 22 includes two U-Net sub-networks stacked together. Stacking sub-networks in this configuration may allow auxiliary neural network 22 to model the sequential processes of boundary computation and sampling points selection. As such, auxiliary neural network 22 may be trained with squared L2 loss between the network prediction and a tensor "proposal" $\tilde{\phi} = \arg\min_\phi E(\phi)$ minimizing (2) subject to (3). Alternatively, objective (2) may be directly used as a regularized loss function.

In one example implementation of example auxiliary neural network 22 shown in FIG. 8, the depth of the first sub-network of varies depending on the input resolution. The structure of the second sub-network is kept fixed. To improve efficiency, only one convolution may be used in each block, instead of two convolutions. The number of features is 256 in all layers except the first layer and the last layer. Padded convolutions may also be used to avoid shrinking of feature maps, and batch normalization may be added after each convolution.

In some examples, segmentation neural network 39 and segmentation model 30 may be configured to produce segmented image data 32 as a final score map of the same size as downsampled input data 26. Thus, the output of segmentation module 28 may need to be upsampled in order to match the original input resolution or other desired pixel resolution. In case of conventional downsampling, this step is a simple upscaling, performed via bilinear interpolation, for example. In techniques of the present disclosure, the non-uniform transformation may be "inverted" by upsampling module 34. Covering constraints (3) ensure that the convex hall of the sampling locations covers the entire image, thus interpolation may recover the score map at the original resolution. In experimental testing, upsampling was performed by SciPy, which is open-source software for mathematics, science, and engineering. SciPy was used to interpolate the unstructured multidimensional data, which employs Delaunay triangulation and barycentric interpolation within triangles.

One technical advantage of the content-adaptive downsampling techniques of this disclosure is that the techniques preserve the grid topology. Thus, some example efficient implementations may skip the triangulation step and use the original grid structure. The interpolation problem reduces to a computer graphics problem of rendering a filled triangle, which can be efficiently solved by Bresenham's algorithm.

Experimental Results

The techniques described herein were applied to for semantic segmentation on many high-resolution datasets and state-of-the-art approaches. FIG. 9 shows a few qualitative examples of the present techniques as applied to the "Cityscapes" dataset described in M. Cordts, et al., IEEE Conference on Computer Vision and Pattern Recognition (CVPR), 2016.

For example, FIG. 9 includes:
  a. a first column of images (leftmost column) showing five example original images and non-uniform 8×8 sampling tensor (dots) produced by a trained auxiliary net,
  b. a second column of images showing labeled data, i.e., ground truth data for training the auxiliary neural network,
  c. a third column of images shown results as applied to the PSP-Net dataset with uniform downsampling to 128× 128, and
  d. a fourth column of images (rightmost column) showing results of the same network with example 128×128 adaptive downsampling techniques described herein based on sampling tensors of the first column.

In this experiment, high-resolution segmentation results depicted in columns (c) and (d) were computed using interpolations of classifications for uniformly and adaptively downsampled pixels, respectively.

Techniques of this disclosure were evaluated and compared on several public semantic segmentation datasets. Computational requirements of the contemporaneous approaches and the cost of annotations conditioned the low resolution of images or imprecise (e.g., rough) annotations in popular semantic segmentation datasets, such as:
  Caltech—S. Agarwal, A. Awan, and D. Roth. Learning to detect objects in images via a sparse, part-based representation. IEEE Transactions on Pattern Analysis and Machine Intelligence (TPAMI), 26(11):1475-1490, 2004,
  Pascal VOC—M. Everingham, L. Van Gool, C. K. I. Williams, J. Winn, and A. Zisserman. The PASCAL Visual Object Classes Challenge 2012 (VOC2012) Results, and
  COCO—T.-Y. Lin, M. Maire, S. Belongie, J. Hays, P. Perona, D. Ramanan, P. Doll'ar, and C. L. Zitnick. Microsoft coco: Common objects in context. In European Conference on Computer Vision (ECCV), pages 740-755. Springer, 2014.

With rapid development of autonomous driving, a number of new semantic segmentation datasets focusing on road scenes or synthetic datasets have been made available. These recent datasets provide high-resolution data and high-quality annotations. Experiments were performed using the following datasets with high-resolution images:
  ApolloScapes—X. Huang, X. Cheng, Q. Geng, B. Cao, D. Zhou, P. Wang, Y. Lin, and R. Yang, The apolloscape dataset for autonomous driving. arXiv preprint arXiv: 1803.06184, 2018,
  CityScapes—M. Cordts, M. Omran, S. Ramos, T. Rehfeld, M. Enzweiler, R. Benenson, U. Franke, S. Roth, and B. Schiele, The cityscapes dataset for semantic urban scene understanding, Proc. of the IEEE Conference on Computer Vision and Pattern Recognition (CVPR), 2016.,
  Synthia—G. Ros, L. Sellart, J. Materzynska, D. Vazquez, and A. M. Lopez, The SYNTHIA Dataset: A Large Collection of Synthetic Images for Semantic Segmentation of Urban Scenes (SYNTHIA-Rand), IEEE Conference on Computer Vision and Pattern Recognition (CVPR), June 2016, and
  Supervisely (person segmentation)—Releasing "Supervisely Person" dataset for teaching machines to segment humans, https://hackernoon.com/releasing-supervisely-persondataset-for-teaching-machines-to-segment-humans-1f1fc1f28469, 2018.

One example evaluation metric used in the experiments was "mean Intersection over Union" (mIoU). The metric was evaluated on segmentation results at the original resolution. Performance may be compared at various downsampling resolutions to emulate different operating requirements. Occasionally, other metrics were used to demonstrate different features of the example techniques of this disclosure.

In the experiments, the techniques of this disclosure were implemented in Caffe2, which is a lightweight, modular, and scalable deep learning framework. For both the non-uniform sampler network and segmentation network, the Adam optimization method was used with (base learning rate, #epochs) of ($10^{-5}$, 33), ($10^{-4}$, 1000), ($10^{-4}$, 500) for datasets ApolloScape, Supervisely, and Synthia, respectively. Exponential learning rate policy was employed. Table 1 shows the batch size:

TABLE 1

| input resolution | 16 | 32 | 64 | 128 | 256 | 512 |
|---|---|---|---|---|---|---|
| batch size | 128 | 128 | 128 | 32 | 24 | 12 |

Experiments with PSP-Net and Deeplabv3+ used public implementations with the default parameters.

In the experiments, segmentation networks fed with uniformly downsampled images as a baseline were considered. The uniform downsampling of the tested segmentation networks was replaced with adaptive techniques described herein. The interpolation of the predictions followed the techniques described above. The auxiliary network was separately trained with ground truth produced by equation (2) with $\lambda=1$. The auxiliary network predicted a sampling tensor of size (2; 8; 8), which was resized to a required downsampling resolution. During training of the segmentation network, the experiments did not include an upsampling stage (for both baseline and proposed models) but instead downsampled the label map. The experiments used of the softmax-entropy loss.

During training, a largest square was randomly cropped from an image. For example, if the original image is 3384×2710, a patch of size 2710×2710 was selected. Additionally, during training, data was augmented by random left-right flipping, adjusting the contrast, brightness and adding salt-and-pepper noise.

Figure 10:
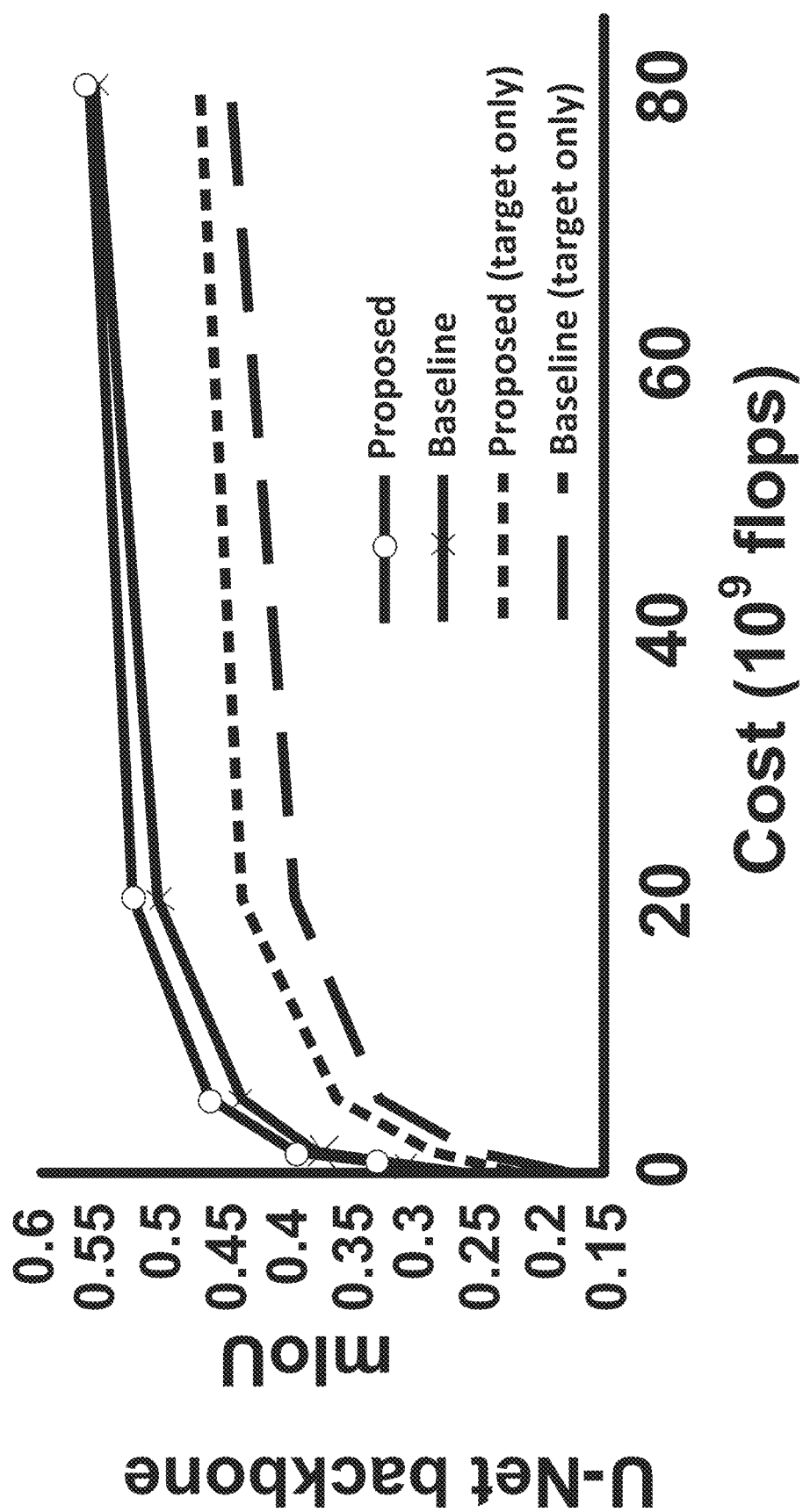
FIG. 10 is a line graph depicting a cost-performance analysis of experimental results for the present techniques applied to the ApolloScape dataset.

FIG. 10 is a line graph depicting a cost-performance analysis of the present techniques applied to data from the ApolloScape dataset, which is an open dataset for autonomous driving. As shown, the techniques described herein performed better than the baseline method. With the same cost, higher quality was be achieved.

The ApolloScape dataset consists of approximately 105 K training and 8 K validation images of size 3384×2710. The annotations contain 22 classes for evaluation. The annotations of some classes (cars, motorbikes, bicycles, persons, riders, trucks, buses and tricycles) are of relatively high quality. These occupy 26% of pixels in evaluation set. These were defined as "target classes." Other classes' annotations are noisy. Since the noise in pixel labels greatly magnifies the noise of segments boundaries, a sampling model was defined based on the target classes boundaries. This exploits an important aspect of the present techniques, e.g., an ability to focus on boundaries of specific semantic classes of interest. Separate metrics were given for these classes.

Table 2 shows per class results on the validation set of ApolloScape and demonstrates that adaptive downsampling based on semantic boundaries improved overall quality of semantic segmentation. Target classes (bold font on the top row) consistently benefited for all resolutions.

TABLE 2

| | downsample resolution | flops. · $10^9$ | road | sidwalk | traffic cone | road pile | fence | traffic light | pole | traffic sign | wall | dustbin | billboard | building |
|---|---|---|---|---|---|---|---|---|---|---|---|---|---|---|
| | | | | | | | | non-target classes, IoU | | | | | | |
| Ours | 32 | 0.38 | 0.92 | 0.38 | 0.17 | 0.00 | 0.49 | 0.11 | 0.08 | 0.44 | 0.28 | 0.03 | 0.00 | 0.74 |
| Baseline | 32 | 0.31 | 0.92 | 0.29 | 0.13 | 0.00 | 0.43 | 0.14 | 0.11 | 0.53 | 0.18 | 0.00 | 0.09 | 0.74 |
| Ours | 64 | 1.31 | 0.94 | 0.39 | 0.31 | 0.02 | 0.56 | 0.25 | 0.17 | 0.61 | 0.41 | 0.08 | 0.00 | 0.78 |
| Baseline | 64 | 1.24 | 0.94 | 0.40 | 0.30 | 0.01 | 0.52 | 0.30 | 0.22 | 0.64 | 0.29 | 0.04 | 0.00 | 0.79 |
| Ours | 128 | 5.05 | 0.95 | 0.51 | 0.43 | 0.07 | 0.61 | 0.44 | 0.29 | 0.71 | 0.47 | 0.13 | 0.01 | 0.84 |
| Baseline | 128 | 4.98 | 0.96 | 0.39 | 0.43 | 0.05 | 0.59 | 0.45 | 0.36 | 0.73 | 0.37 | 0.11 | 0.00 | 0.83 |
| Ours | 256 | 19.99 | 0.96 | 0.44 | 0.51 | 0.13 | 0.66 | 0.58 | 0.42 | 0.78 | 0.58 | 0.27 | 0.00 | 0.84 |
| Baseline | 256 | 19.92 | 0.97 | 0.48 | 0.49 | 0.13 | 0.64 | 0.58 | 0.46 | 0.79 | 0.48 | 0.24 | 0.00 | 0.85 |
| Ours | 512 | 79.76 | 0.97 | 0.44 | 0.54 | 0.21 | 0.68 | 0.63 | 0.49 | 0.80 | 0.67 | 0.36 | 0.00 | 0.85 |
| Baseline | 512 | 79.68 | 0.97 | 0.47 | 0.55 | 0.20 | 0.68 | 0.67 | 0.54 | 0.83 | 0.59 | 0.36 | 0.00 | 0.87 |

| | non-target classes, IoU | | target classes, IoU | | | | | | | | mIoU | |
|---|---|---|---|---|---|---|---|---|---|---|---|---|
| | vegatation | sky | car | motor-bicycle | bicycle | person | rider | truck | bus | tricycle | all classes | target classes |
| Ours | 0.86 | 0.84 | 0.66 | 0.07 | 0.27 | 0.02 | 0.03 | 0.34 | 0.52 | 0.01 | 0.24 | 0.24 |
| Baseline | 0.87 | 0.89 | 0.59 | 0.04 | 0.26 | 0.01 | 0.02 | 0.20 | 0.44 | 0.00 | 0.19 | 0.19 |
| Ours | 0.89 | 0.87 | 0.76 | 0.10 | 0.33 | 0.04 | 0.03 | 0.44 | 0.53 | 0.04 | 0.28 | 0.28 |
| Baseline | 0.90 | 0.91 | 0.70 | 0.06 | 0.31 | 0.02 | 0.03 | 0.32 | 0.52 | 0.03 | 0.25 | 0.25 |
| Ours | 0.91 | 0.88 | 0.83 | 0.16 | 0.41 | 0.08 | 0.05 | 0.57 | 0.76 | 0.06 | 0.36 | 0.36 |
| Baseline | 0.92 | 0.93 | 0.80 | 0.10 | 0.38 | 0.06 | 0.03 | 0.44 | 0.70 | 0.06 | 0.32 | 0.32 |
| Ours | 0.92 | 0.89 | 0.88 | 0.21 | 0.47 | 0.18 | 0.04 | 0.65 | 0.80 | 0.24 | 0.44 | 0.44 |
| Baseline | 0.94 | 0.94 | 0.86 | 0.17 | 0.42 | 0.5 | 0.04 | 0.60 | 0.83 | 0.10 | 0.40 | 0.40 |
| Ours | 0.93 | 0.90 | 0.91 | 0.24 | 0.52 | 0.30 | 0.06 | 0.75 | 0.81 | 0.19 | 0.47 | 0.47 |
| Baseline | 0.94 | 0.94 | 0.90 | 0.21 | 0.49 | 0.26 | 0.03 | 0.68 | 0.84 | 0.13 | 0.44 | 0.44 |

The techniques of this disclosure achieved a mIoU gain of 3-5% for target classes and up to 2% overall. This improvement comes at negligible computational cost. As shown in FIG. 10, examples of this disclosure consistently produced better results, even under fixed computational budgets.

Figure 11:
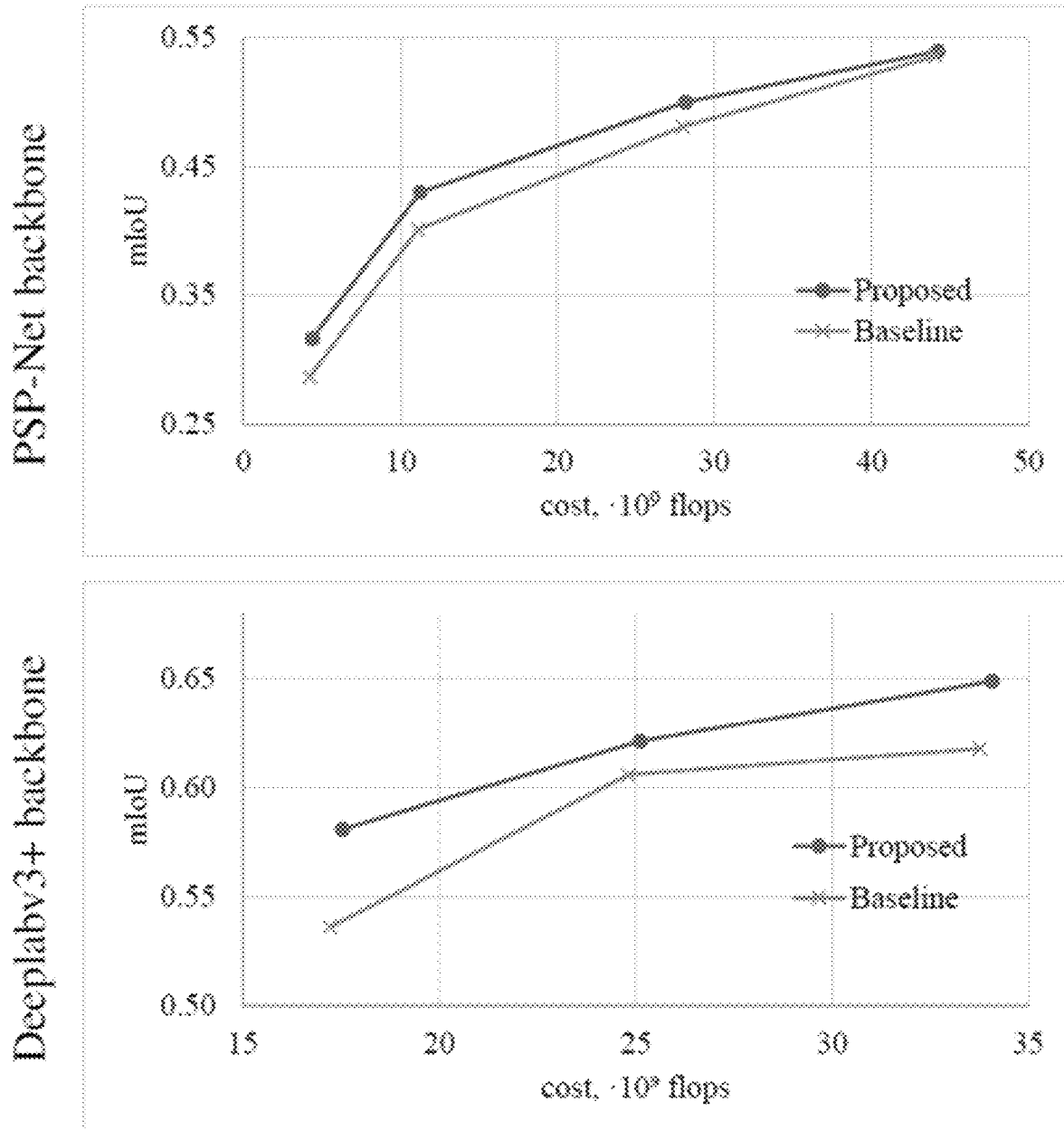
FIG. 11 is a set of line graphs depicting cost-performance analyses of experimental results for the present techniques applied to the CityScapes dataset with PSP-Net and Deeplabv3+ baselines for varying downsampling.

FIG. 11 is a set of line graphs depicting cost-performance analyses of the present techniques applied to the CityScapes dataset with PSP-Net and Deeplabv3+ baselines for varying downsampling size (Table 3). CityScapes is another commonly used open-road scene dataset providing 5 K annotated images of size 1024×2048 with 19 classes in evaluation. Following the same test protocol, the present techniques were evaluated using PSP-Net (with a ResNet50 backbone) and Deeplabv3+ (with an Xception65 backbone) as the base segmentation model. As shown in FIG. 11, content-adaptive downsampling according to the techniques herein achieved better results with the same computational cost. The mIoU results are shown in Table 3 and FIG. 11, further indicating consistent improvements of up to 4%.

TABLE 3

| | backbone | downsample resolution | auxiliary net resolution PSP-Net [57] | flops. · $10^9$ | mIoU | downsample resolution | auxiliary net resolution Deeplabv3+ [8] | flops. · $10^9$ | mIoU |
|---|---|---|---|---|---|---|---|---|---|
| ours | | 64 | 32 | 4.37 | 0.32 | 160 | 32 | 17.54 | 0.58 |
| baseline | | | — | 4.20 | 0.29 | | — | 17.23 | 0.54 |
| ours | | 128 | 32 | 11.25 | 0.43 | 192 | 32 | 25.12 | 0.62 |
| baseline | | | — | 11.08 | 0.40 | | — | 24.81 | 0.61 |

TABLE 3-continued

| backbone | downsample resolution | auxiliary net resolution PSP-Net [57] | flops. · $10^9$ | mIoU | downsample resolution | auxiliary net resolution Deeplabv3+ [8] | flops. · $10^9$ | mIoU |
|---|---|---|---|---|---|---|---|---|
| ours | 256 | 32 | 44.22 | 0.54 | 224 | 32 | 34.08 | 0.65 |
| baseline | | — | 44.05 | 0.54 | | — | 33.77 | 0.62 |

Figure 12:
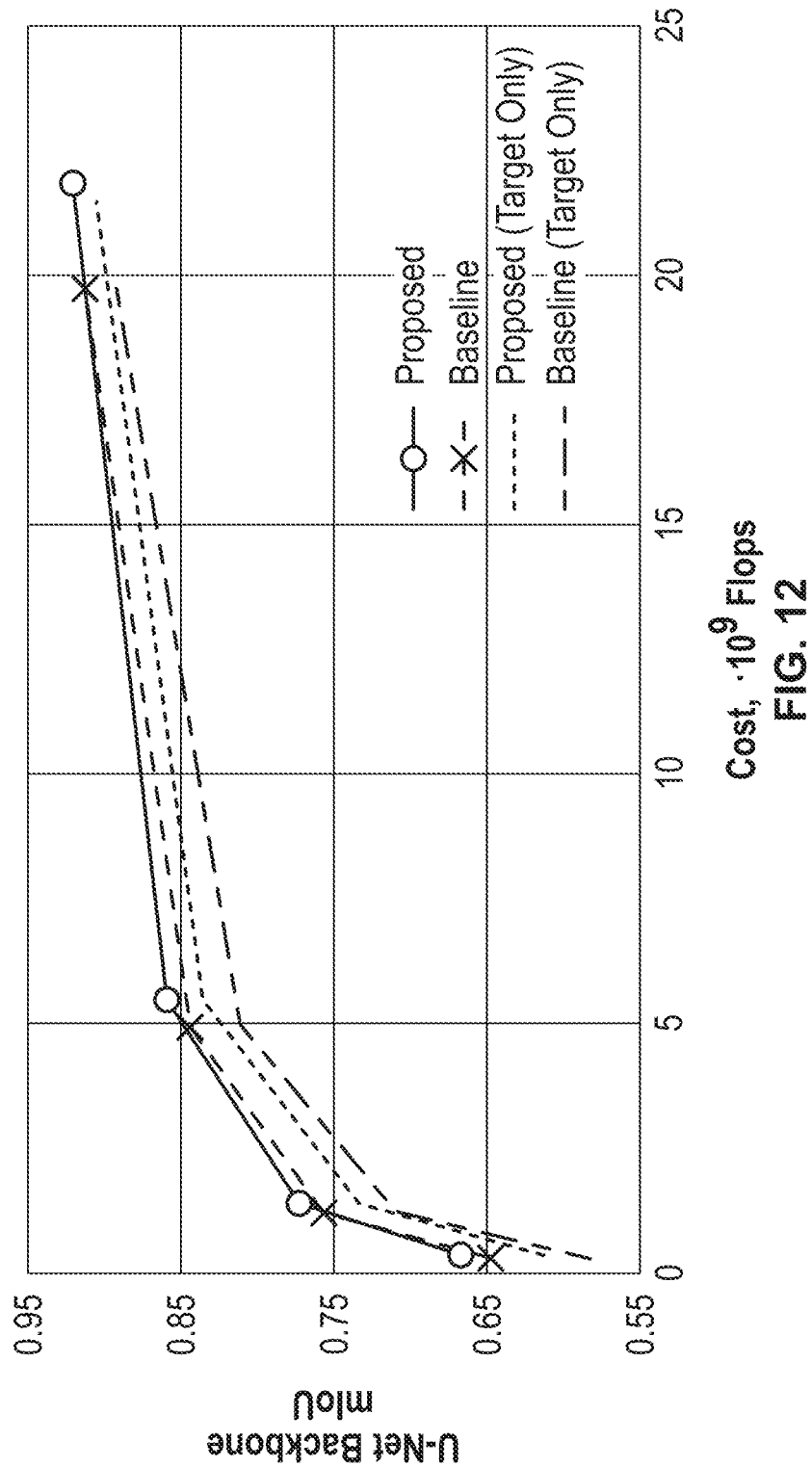
FIG. 12 is a line graph depicting a cost-performance analysis of experimental results for the present techniques applied to the Synthia dataset.

FIG. 12 is a line graph depicting a cost-performance analysis of techniques of this disclosure as applied to the Synthia dataset, which is a synthetic dataset of 13,000 high-definition images taken from an array of cameras moving randomly through a city. The results in Table 4 indicate that the present techniques improved upon the baseline model. The cost-performance analysis in FIG. 12 shows that the present techniques improved segmentation quality of target classes by 1.5% to 3% at negligible cost.

TABLE 4

| | downsample resolution | flops, ·$10^9$ | all classes | target classes |
|---|---|---|---|---|
| ours | 32 | 0.38 | 0.67 | 0.61 |
| baseline | | 0.31 | 0.65 | 0.58 |
| ours | 64 | 1.40 | 0.77 | 0.73 |
| baseline | | 1.23 | 0.76 | 0.71 |
| ours | 128 | 5.49 | 0.86 | 0.83 |
| baseline | | 4.93 | 0.84 | 0.81 |
| ours | 256 | 21.85 | 0.92 | 0.91 |
| baseline | | 19.74 | 0.91 | 0.89 |

Figure 13:
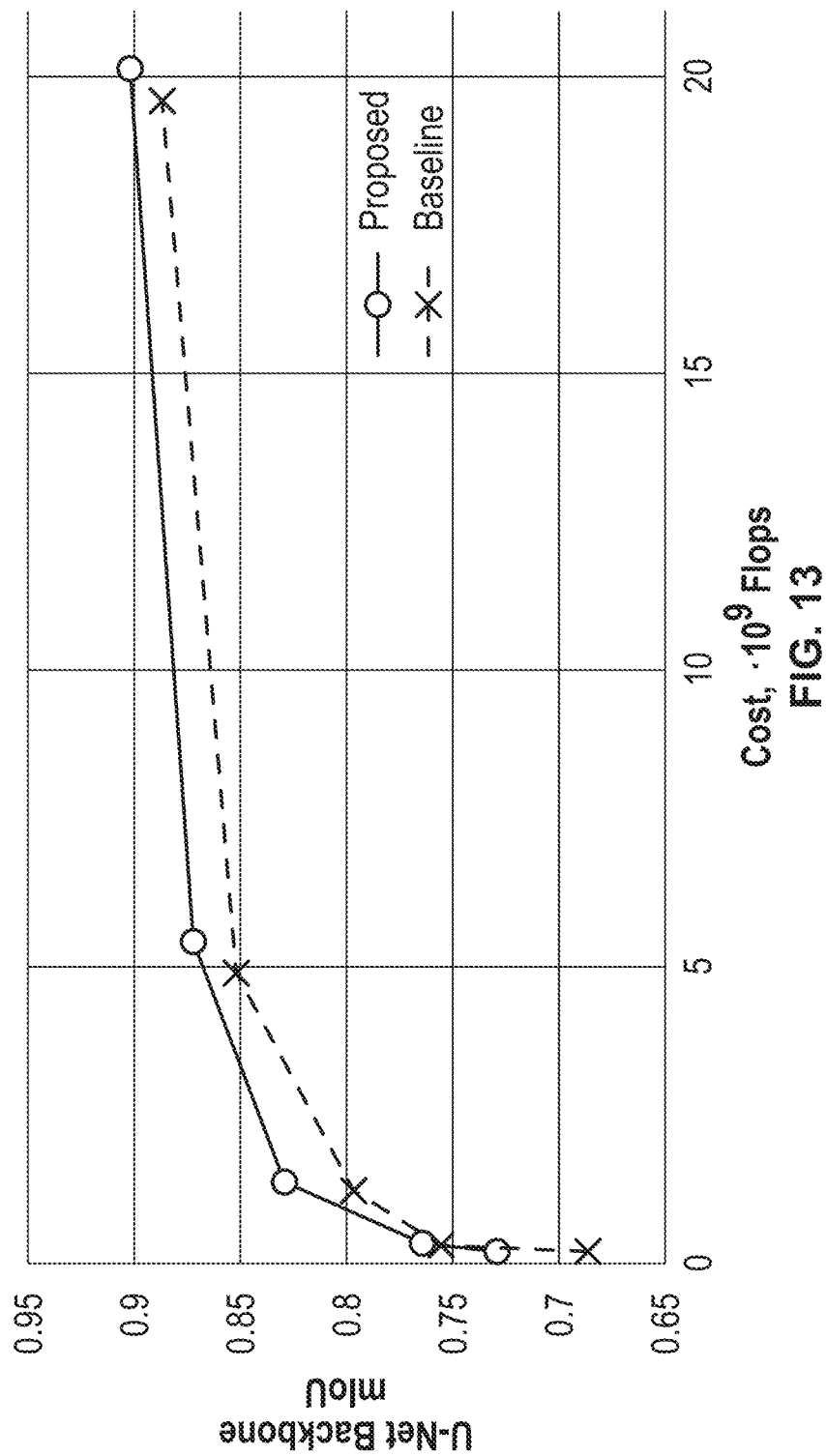
FIG. 13 is a line graph depicting a cost-performance analysis of techniques of this disclosure as applied to the Supervisely dataset. Example techniques of this disclosure may improve quality of segmentation.

FIG. 13 is a line graph depicting a cost-performance analysis of techniques of this disclosure as applied to the Supervisely dataset, which is a collection of 5,711 high-resolution images with 6,884 high-quality annotated person instances. The dataset contains pictures of people taken in different conditions, including portraits, landscapes, and cityscapes. For testing, the dataset was randomly split into training subsets (5140) and testing subsets (571). The dataset has only two labels: "person" and "background." Segmentation results for this dataset are shown in Table 5 with a cost-performance analysis with respect to the baseline shown in FIG. 13. The experiment shows absolute mIoU increases up to 5:8%, confirming the advantages of non-uniform downsampling for person-segmentation tasks as well.

TABLE 5

| | downsample resolution | flops, ·$10^9$ | mIoU | back-ground | person |
|---|---|---|---|---|---|
| ours | 16 | 0.15 | 0.73 | 0.84 | 0.62 |
| baseline | | 0.07 | 0.69 | 0.81 | 0.56 |
| ours | 32 | 0.35 | 0.76 | 0.86 | 0.67 |
| baseline | | 0.30 | 0.76 | 0.85 | 0.66 |
| ours | 64 | 1.39 | 0.83 | 0.90 | 0.76 |
| baseline | | 1.22 | 0.80 | 0.88 | 0.71 |
| ours | 128 | 5.42 | 0.87 | 0.93 | 0.82 |
| baseline | | 4.90 | 0.85 | 0.91 | 0.79 |
| ours | 256 | 20.11 | 0.90 | 0.94 | 0.86 |
| baseline | | 19.59 | 0.89 | 0.93 | 0.84 |

Figure 14:
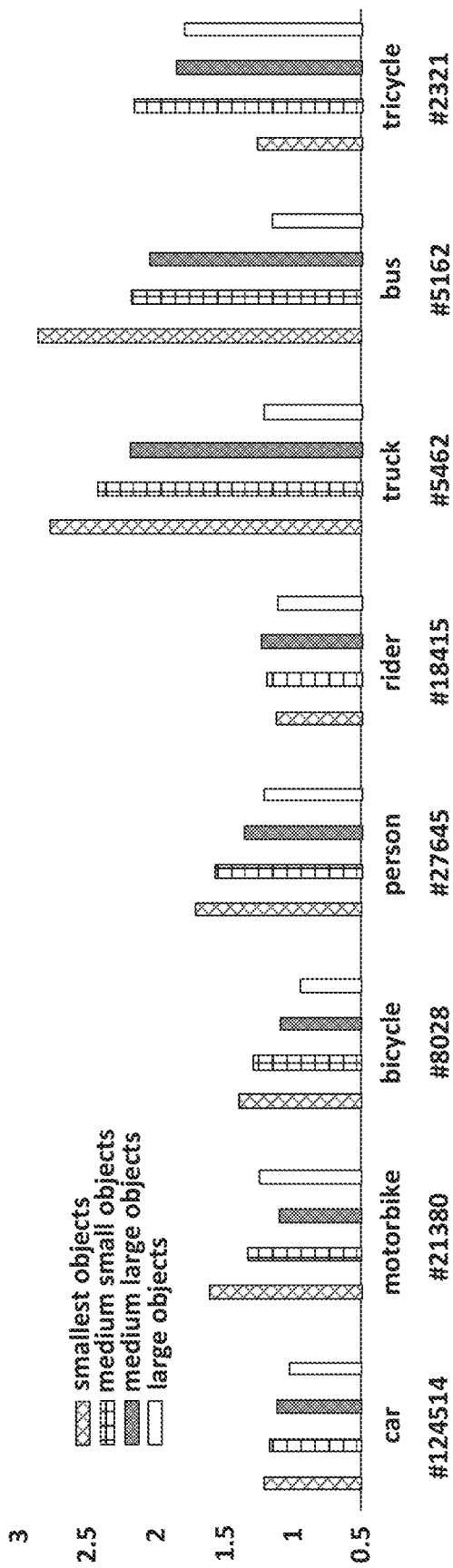
FIG. 14 is a bar graph depicting experimental results for average recall of objects broken down by object classes and sizes on the validation set of ApolloScapes.

FIG. 14 is a bar graph depicting average recall of objects broken down by object classes and sizes on the validation set of ApolloScapes. Values are expressed relative to the baseline. All objects of a class may be split into 4 equally sized bins based on objects' area. Smaller bin numbers may correspond to objects of smaller size. The total number of objects in each class may be marked by "#". As well as in FIG. 16, there may be a negative correlation between object sizes and relative recall for all classes except rare "rider" and "tricycle".

Figure 15:
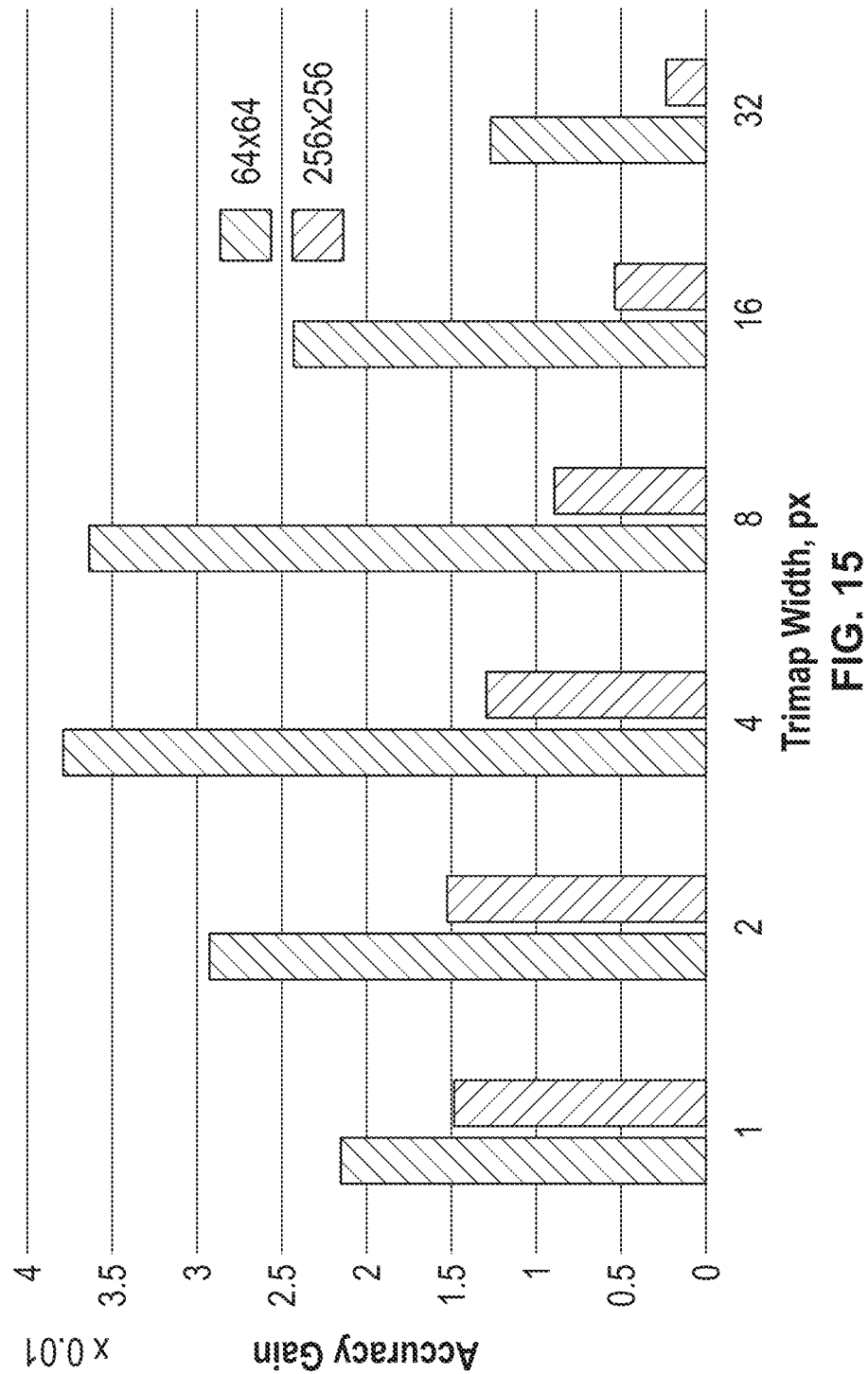
FIG. 15 is a bar graph depicting experimental results for absolute accuracy difference between approaches in accordance with this disclosure and the baseline around semantic boundaries on the Supervisely dataset for downsampling resolutions 64×64 and 256×256.

The experiments were designed to demonstrate that the present techniques also improve boundary precision. For example, a standard trimap approach was adopted where the classification accuracy was computed within a band (called a "trimap") of varying width around boundaries of segments. The trimap plots were computed for two input resolutions for the person-segmentation dataset described above. FIG. 15 is a bar graph depicting absolute accuracy difference between approaches in accordance with this disclosure and the baseline around semantic boundaries on the Supervisely dataset for downsampling resolutions 64×64 and 256×256.

Figure 16:
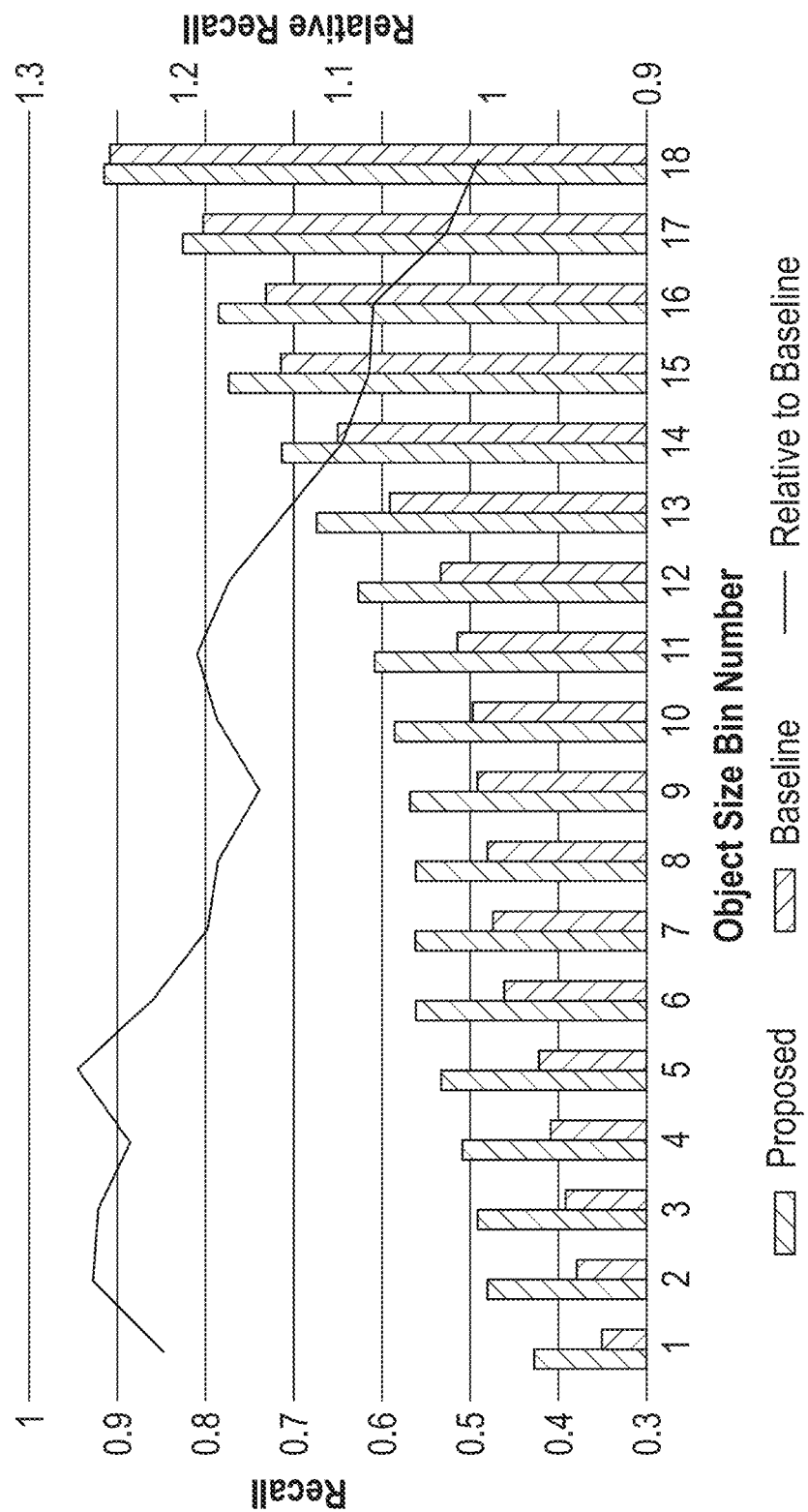
FIG. 16 is a bar graph depicting experimental results for an average recall of objects of different sizes.

Since the example adaptive downsampling techniques of this disclosure is trained to select more points around semantic boundaries, the techniques implicitly provide larger support for small objects. This results in better performance of the overall system on these objects. Instance-level annotations were used to confirm this by analyzing quality statistics with respect to individual objects. This is in contrast to usual pixel-centric segmentation metrics (e.g., mIoU or accuracy). For example, the "recall" of a segmentation of an object is defined as ratio of pixels classified correctly (e.g., pixel predicted to belong to the true object class) to the total number of pixels in the object. FIGS. 14 and 16 show experimental results with respect to the improvement of recall over baseline for objects of different sizes and categories. The techniques of this disclosure may degrade more gracefully than the uniform downsampling as the object size decreases.

For example, FIG. 14 is a bar graph depicting average recall of objects broken down by object classes and sizes on the validation set of ApolloScapes. Values are expressed relative to the baseline. All objects of a class were split into several equally sized bins based on an objects' area. Smaller bin numbers correspond to objects of smaller size. The total number of objects in each class is marked by "#" in FIG. 14. As well as in FIG. 16, there was a negative correlation between object sizes and relative recall for all classes except rare "rider" and "tricycle".

FIG. 16 is a bar graph depicting an average recall of objects of different sizes. All objects in the validation set of ApolloScapes may be grouped into several equally sized bins by their area. A smaller bin number may correspond to smaller objects. Downsample resolution is 64×64. Baseline may be improved more on smaller objects. The green curve (right vertical axis) shows that the relative recall (the average recall of baseline is taken for 1) may be negatively correlated with the object sizes.

In this disclosure, systems and techniques are described to perform non-uniform content-aware downsampling as an alternative to uniform downsampling to reduce the computational cost for semantic segmentation systems. In some examples, the adaptive downsampling parameters may be computed by an auxiliary CNN that learns from a nonuniform sample geometric model driven by semantic boundaries. Although the auxiliary network may require additional computations, the experimental results show that the network may improve segmentation performance while keeping the added cost low, providing a better cost-performance balance. The present techniques may significantly improve performance on small objects and produce more precise boundaries. In addition, any off-the-shelf segmentation system can benefit from the techniques of this disclosure as they may be implemented as an additional block enclosing the system. Some example adaptive sampling may benefit other applications with pixel-level predictions where boundary accuracy is important and downsampling is used to reduce computational cost.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), Flash memory, a hard disk, a CD-ROM, a digital video disc (DVD), a Blu-ray Disc, a floppy disk, a cassette, magnetic media, optical media, or other computer readable media.

What is claimed is:

1. A computer vision system comprising:
   a memory;
   one or more processors operably coupled to the memory;
   a downsampling module configured for execution by the one or more processors to downsample, based on a non-uniform sampling model trained to predict content-aware sampling parameters, input image data to generate downsampled image data,
   wherein the input image data includes an object, and
   wherein the downsampling module is configured to apply the content-aware sampling parameters to downsample pixels of the input image data within a semantic boundary of the object at a higher sampling resolution than a sampling resolution for pixels of the input image data that are outside the semantic boundary of the object;
   a segmentation module configured for execution by the one or more processors to segment the downsampled image data to produce a segmentation result; and
   an upsampling module configured for execution by the one or more processors to upsample the segmentation result to produce upsampled image data.

2. The computer vision system of claim 1, wherein the downsampling module is configured to execute a neural network trained to compute content-aware sampling parameters for generating the downsampled image data.

3. The computer vision system of claim 2, wherein the neural network is configured according to a double U-Net architecture having two sub-networks stacked together.

4. The computer vision system of claim 1, wherein the downsampling module is configured to compute the content-aware sampling parameters as a set of sampling locations that specify spatial coordinates for semantic boundaries of objects within the input image data for target classes.

5. The computer vision system of claim 1,
   wherein the segmentation module is configured to produce the segmentation result as a feature map that segments the downsampled image data by assigning the pixels within the downsampled image data to respective object classes, the feature map having a pixel resolution less than a pixel resolution of the input image data, and
   wherein the upsampling module is configured to produce the upsampled image data as an upsampled feature map that specifies pixel locations of the object classes at a pixel resolution higher than a resolution of the downsampled image data.

6. The computer vision system of claim 1, wherein, to upsample the segmentation result, the upsampling module is configured to interpolate unstructured multi-dimensional data using Delaunay triangulation and barycentric interpolation within triangles.

7. The computer vision system of claim 1, wherein the computer vision system comprises one of an autonomous vehicle, an autopilot system, a navigation system, a camera-based security system or an imaging system.

8. A method comprising:
   downsampling, based on a non-uniform sampling model, input image data to generate downsampled image data,
   wherein the input image data includes an object, and
   wherein downsampling the input image data to produce the downsampled image data comprises applying the content-aware sampling parameters to downsample pixels of the input image data within a semantic boundary of the object at a higher sampling resolution than a sampling resolution for pixels of the input image data that are outside the semantic boundary of the object;
   segmenting the downsampled image data to generate a segmentation result; and
   upsampling the segmentation result to produce upsampled image data.

9. The method of claim 8, wherein downsampling the input image data comprises:
   executing a neural network according to the non-uniform sampling model to predict content-aware sampling parameters for the input image data, wherein the sampling parameters specify spatial coordinates for semantic boundaries between objects within the input image data for one or more target classes; and downsampling the input image data according to the predicted sampling parameters to generate the downsampled image data.

10. The method of claim 9, wherein the neural network is configured according to a double U-Net architecture having two sub-networks stacked together.

11. The method of claim 8, wherein segmenting the downsampled image data comprises generating a feature map that segments the downsampled image data by assigning pixels within the downsampled image data to respective object classes, the feature map having a pixel resolution less than a pixel resolution of the input image data, and wherein upsampling the upsampled image data comprises generating an upsampled feature map that specifies pixel locations of the object classes at a pixel resolution higher than a resolution of the downsampled image data.

12. The method of claim 8, wherein performing upsampling on the segmentation result comprises interpolating unstructured multi-dimensional data using Delaunay triangulation and barycentric interpolation within triangles.

13. A nonvolatile computer-readable medium comprising instructions that configure a processor to:

execute an auxiliary neural network according to a non-uniform sampling model trained to predict content-aware sampling parameters for input image data, wherein the sampling parameters specify spatial coordinates for semantic boundaries between objects within the input image data for one or more target classes;

execute a segmentation neural network to downsample, according to the predicted sampling parameters, the input image data to generate downsampled image data, wherein the input image data includes an object, wherein downsampling the input image data includes applying the predicted sampling parameters to downsample pixels of the input image data within a semantic boundary of the object at a higher sampling resolution than a sampling resolution for pixels of the input image data that are outside the semantic boundary of the object;

segment the downsampled image data to generate a segmentation result; and upsample the segmentation result to produce upsampled image data.

14. The nonvolatile computer-readable medium of claim 13, further comprising instructions to configure the processor to:

segment the downsampled image data by generating a feature map that segments the downsampled image data by assigning the pixels within the downsampled image data to respective object classes, the feature map having a pixel resolution less than a pixel resolution of the input image data, and upsample the segmentation result to produce the upsampled image data by generating an upsampled feature map that specifies pixel locations of the object classes at a pixel resolution higher than a resolution of the downsampled image data.

* * * * *